(12) United States Patent
Masuda et al.

(10) Patent No.: US 8,711,152 B2
(45) Date of Patent: Apr. 29, 2014

(54) ANIMATION CONTROL APPARATUS, ANIMATION CONTROL METHOD, AND NON-TRANSITORY COMPUTER READABLE RECORDING MEDIUM

(75) Inventors: Kenji Masuda, Osaka (JP); Mitsuhiro Aso, Osaka (JP)

(73) Assignee: Panasonic Corporation, Osaka (JP)

( * ) Notice: Subject to any disclaimer, the term of this patent is extended or adjusted under 35 U.S.C. 154(b) by 143 days.

(21) Appl. No.: 13/390,604

(22) PCT Filed: May 31, 2011

(86) PCT No.: PCT/JP2011/003034
§ 371 (c)(1),
(2), (4) Date: Feb. 15, 2012

(87) PCT Pub. No.: WO2011/158446
PCT Pub. Date: Dec. 22, 2011

(65) Prior Publication Data
US 2012/0147013 A1 Jun. 14, 2012

(30) Foreign Application Priority Data
Jun. 16, 2010 (JP) .................................. 2010-137258

(51) Int. Cl.
*G06T 13/00* (2011.01)
*G06T 13/80* (2011.01)

(52) U.S. Cl.
CPC *G06T 13/80* (2013.01); *G06T 13/00* (2013.01)
USPC .......................................................... 345/473

(58) Field of Classification Search
CPC .................................. G06T 13/00; G06T 13/80
USPC .......................................................... 345/473
See application file for complete search history.

(56) References Cited

U.S. PATENT DOCUMENTS

| 6,049,628 A | * | 4/2000 | Chen et al. .................... 382/238 |
| 6,369,910 B1 | * | 4/2002 | Mitani .......................... 358/1.17 |
| 6,661,418 B1 | * | 12/2003 | McMillan et al. ............ 345/473 |
| 6,914,692 B1 | * | 7/2005 | Mitani .......................... 358/1.17 |
| 7,656,406 B1 | * | 2/2010 | Bartell et al. ................. 345/441 |

FOREIGN PATENT DOCUMENTS

| JP | 2003-131648 | 5/2003 |
| JP | 2003-331311 | 11/2003 |
| JP | 3616241 | 11/2004 |

OTHER PUBLICATIONS

International Search Report issued Jun. 28, 2011 in International (PCT) Application No. PCT/JP2011/003034.

* cited by examiner

*Primary Examiner* — David Zarka
*Assistant Examiner* — Terrell Robinson
(74) *Attorney, Agent, or Firm* — Wenderoth, Lind & Ponack, L.L.P.

(57) ABSTRACT

An animation control apparatus includes an interpolation component information creating unit that interpolates first and second component information included in first and second keyframe information, to create interpolation component information expressing an interpolation screen component; a rendering time period computing unit that calculates a rendering time period required in a rendering process of the interpolation screen component; and a rendering determination unit that determines, based on the rendering time period, whether or not the rendering process of the interpolation screen component is completed by a second rendering start time included in the second keyframe information. A display controller waits without performing the rendering process of the interpolation screen component, when determination is made that the rendering process is not completed by the second rendering start time, and then starts a rendering process of a screen component expressed by the second component information.

12 Claims, 13 Drawing Sheets

ANIMATION CONTROL APPARATUS, ANIMATION CONTROL METHOD, AND NON-TRANSITORY COMPUTER READABLE RECORDING MEDIUM

BACKGROUND OF INVENTION

1. Technical Field

The present invention relates to an animation display technology to display on a display unit by animation a screen component configuring a display screen. In particular, the present invention relates to an animation control apparatus, an animation control method, and an animation control program, which use screen components of frames functioning as keys in time series (keyframes), to generate and display the screen components between the keyframes in real time.

2. Background Art

The number and types of data items used by users have been increasing drastically with the spread of personal computers and the digitalization of consumer electronic devices. This, in turn, leads to an increase in size of displays that display a large quantity of data stored in the personal computers and the digital consumer electronic devices. The most common resolution of the displays is Full HD (1920×1080), but resolution called 4k2k (3840×2160) is expected to become mainstream. With the increase in size of the displays, the number of data items that can be displayed at once on a screen tends to increase.

In recent years, a user interface (UI) has been an important constituent part in digital equipment. In addition to the features of a conventional UI, such as a list display of data, display effects that provide graphical screens and a light operation feeling are also important, and differentiation of the equipment has been promoted by allowing the users to realize the enjoyment of operating the equipment. Specific examples of the graphical screens include Cover Flow that is mounted in Apple's cell phones.

However, creating a UI for graphically displaying a large quantity of data involves the following problems. In other words, when creating a graphical UI, a desired display effect or a combination of a plurality of display effects needs to be applied to screen components, such as diagrams, configuring a display screen. The greater the number of screen components to be displayed, the greater the number of screen components to be installed and the more the development time and costs for setting the display effects applied thereto.

For example, suppose that an animation effect is set in each screen component in an operation screen for displaying a list of massive data items stored in equipment. Because the operation screen showing a list of data items has a large number of data items to be displayed, naturally the number of screen components is also large. Furthermore, the display effect is applied to each of the screen components, which makes it difficult to carry out a development within a short period of time, due to the increased number of screen components.

In the conventional art, the following method is considered in order to reduce the problem. In other words, keyframe information that corresponds to a single screen component and configures an animation is stored as basic keyframe information, and this basic keyframe information is enlarged/reduced in accordance with the other screen components, to display the other screen components by animation. This method reduces the development time and costs.

This method, however, has the following problem. In other words, reusing the basic keyframe information by enlarging/reducing it changes a space between points of a trajectory. In other words, a long distance or a short distance is expressed by the same number of keyframes.

Thus, there is known a conventional animation control apparatus that retains keyframe information having time information and sequentially generates and starts rendering interpolation frames in response to completion of a rendering process for rendering one frame (see Patent Document 1, for example). FIG. 14 is a block diagram showing a configuration of the conventional animation control apparatus described in Patent Document 1.

In FIG. 14, a timer 601 is used for acquiring time information upon completion of the rendering process for rendering one frame. A CPU 602 uses keyframe information stored in a keyframe information storage unit 603, to generate an interpolation frame corresponding to the time acquired from the timer 601, render the interpolation frame on a graphic memory 604, and display the interpolation frame on a display screen 605. In this manner, a keyframe is interpolated to achieve smooth animation display, even when realizing a long distance or a short distance using the same number of keyframes.

However, the problem in the configuration described in Patent Document 1 is that the shape of an animation trajectory is likely to change because interpolation frames are sequentially generated and rendered in response to completion of the rendering process for rendering one frame.

Next is described a situation that becomes a problem in the configuration of Patent Document 1. FIGS. 15A to 15C are diagrams for illustrating the problem of the apparatus described in Patent Document 1 and shows an animation display example that is generated based on keyframe information. FIG. 15A shows key components 611 to 614 of a keyframe that corresponds to inflection points of an animation trajectory are extracted and displayed. FIG. 15B shows an example in which the technique described in Patent Document 1 is used to generate interpolation components 615 to 618 of an interpolation frame in corresponding sections. FIG. 15C shows an animation trajectory to be displayed on the display screen 605 by inserting the interpolation frame into the keyframe by means of Patent Document 1.

Note that in this specification, a screen component expressed by keyframe information is referred to as "key component," and the entire frame in which the key component is rendered is referred to as "keyframe." Similarly, a screen component that is created by interpolating the keyframe information is referred to as "interpolation component," and the entire frame in which the interpolation component is rendered is referred to as "interpolation frame."

In FIG. 15A, the animation trajectory expressed by the key components 611 to 614 is a trajectory that is expressed by a model of a falling object, and expresses an animation in which an object falls from the key component 611 to the key component 612, bounces up to the key component 613, and falls again to the key component 614. By rendering these key components successively based on the keyframe information, the object that moves in the trajectory shown in FIG. 15A is displayed by animation.

In FIG. 15B, according to Patent Document 1, the interpolation components 615, 616 are generated between the key component 611 and the key component 612. In response to completion of the rendering process for rendering one frame, the subsequent frame is generated. Therefore, after completion of rendering the interpolation component 615, the interpolation component 616 is generated and rendered. However, a rendering start time that is retained by the keyframe information of the key component 612 might be reached prior to the completion of rendering the interpolation component 616.

In this case, according to Patent Document 1, rendering of the subsequent frame is not started until rendering of the interpolation component 616 is completed. Therefore, a rendering completion time at which rendering of the interpolation component 616 is completed, which is a rendering start time for start rendering the subsequent frame, is a time point at which the interpolation component 617 is rendered. Consequently, the interpolation component 617 is generated/rendered by using data of the keyframe information expressing the key component 612 and data of the keyframe information expressing the key component 613. As a result, a keyframe for displaying the key component 612 (shown in a dashed line) is not rendered. In this case, such a situation where a keyframe is not displayed does not necessarily happen; thus, depending on the timing, a keyframe is rendered, as expressed by the interpolation components 617, 618 or the key component 613. As a result of not rendering the key component 612, the animation trajectory is displayed on the display screen 605, as shown in FIG. 15C.

In the conventional art, therefore, although the display of the trajectory shown in FIG. 15A is simulated, the simulation results in the trajectory shown in FIG. 15C. In other words, the problem is that a trajectory with inflection points changes its shape if a key component based on a corresponding keyframe information is not rendered in predetermined coordinates at a predetermined time. Especially when using a physical model or the like to create an animation, although the effects of smoothly moving the animation itself can be obtained by the interpolation frames, the trajectory thereof changes its shape, causing a feeling of strangeness on the users.

Patent Document 1: Japanese Patent Publication No. 3616241

SUMMARY OF THE INVENTION

The present invention was contrived in order to solve the conventional problems described above and aims at providing an animation control apparatus, an animation control method, and an animation control program, which are capable of preventing an animation trajectory from deforming.

An animation control apparatus according to one aspect of the present invention is an animation control apparatus for displaying on a display unit by animation a screen component configuring a display screen, the apparatus having: a keyframe information storage unit that stores a plurality of keyframe information each of which includes start time information and component information, the start time information expressing a rendering start time at which a rendering process for displaying a screen component on the display unit should be started, the component information expressing a screen component that is displayed on the display unit by starting the rendering process at the rendering start time; an animation controller that acquires a current rendering start time at which the rendering process should be started, and acquires, from the keyframe information storage unit, first keyframe information that includes a first rendering start time prior to the acquired current rendering start time and second keyframe information that includes a second rendering start time following the current rendering start time; an interpolation component information creating unit that interpolates first component information, which is included in the first keyframe information acquired by the animation controller, and second component information, which is included in the second keyframe information acquired by the animation controller, to create interpolation component information expressing an interpolation screen component displayed on the display unit; a rendering performance information storage unit that stores rendering performance information expressing a performance of the rendering process; a rendering time period computing unit that calculates a rendering time period that is required in a rendering process for displaying on the display unit the interpolation screen component expressed by the interpolation component information, on a basis of the rendering performance information stored in the rendering performance information storage unit and the interpolation component information created by the interpolation component information creating unit; a rendering determination unit that determines, on a basis of the rendering time period calculated by the rendering time period computing unit, whether or not a rendering process for displaying the interpolation screen component on the display unit is completed by the second rendering start time included in the second keyframe information; and a display controller that waits until the second rendering start time without performing a rendering process for displaying the interpolation screen component on the display unit, when the rendering determination unit determines that a rendering process for displaying the interpolation screen component on the display unit is not completed by the second rendering start time, and starts a rendering process for displaying, on the display unit, a screen component expressed by the second component information included in the second keyframe information when the second rendering start time is reached.

DETAILED DESCRIPTION OF INVENTION

Embodiments of the present invention are described hereinafter with reference to the drawings.

Figure 1:
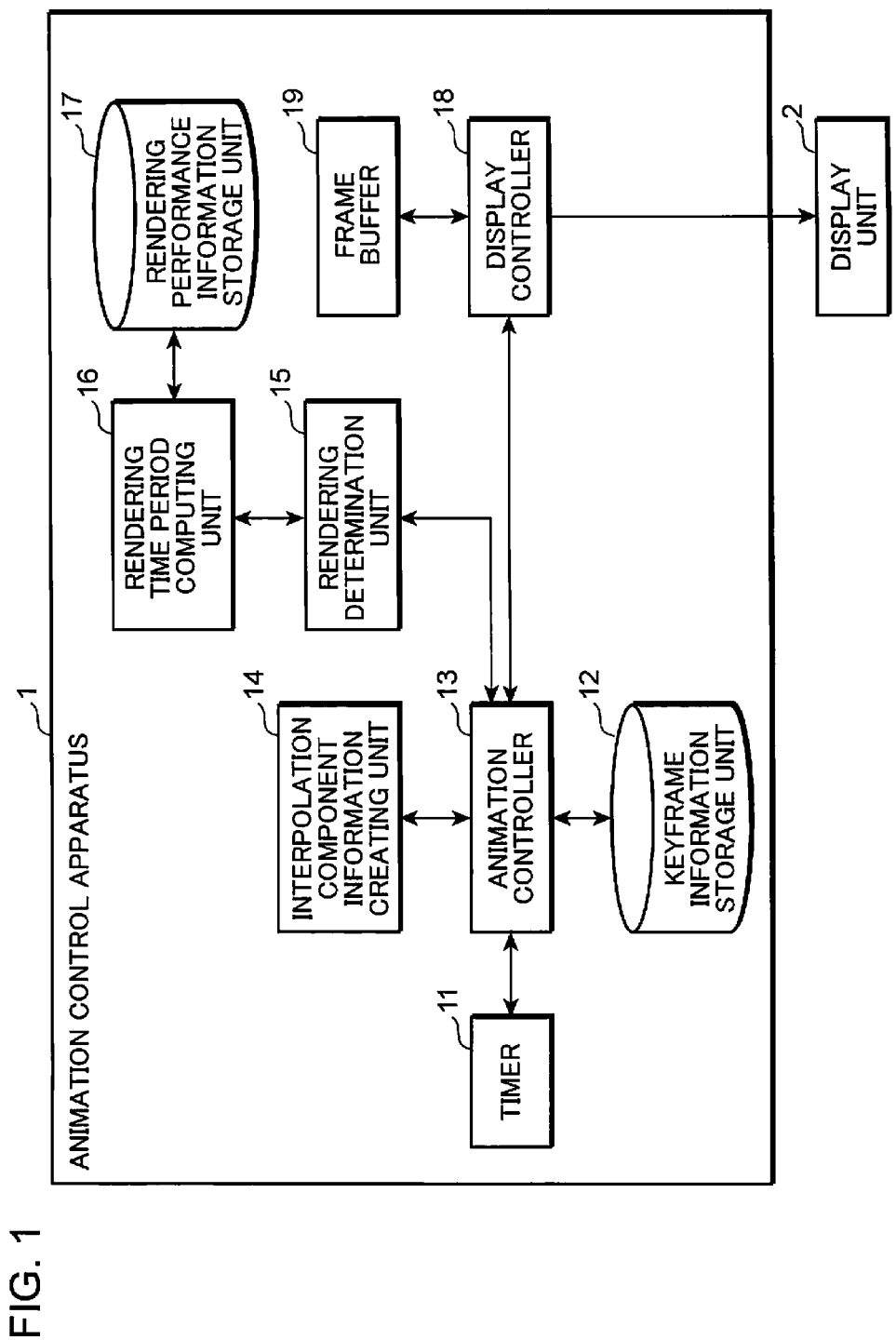
FIG. 1 is a block diagram showing a configuration of an animation control apparatus according to an embodiment of the present invention.
Figure 2:
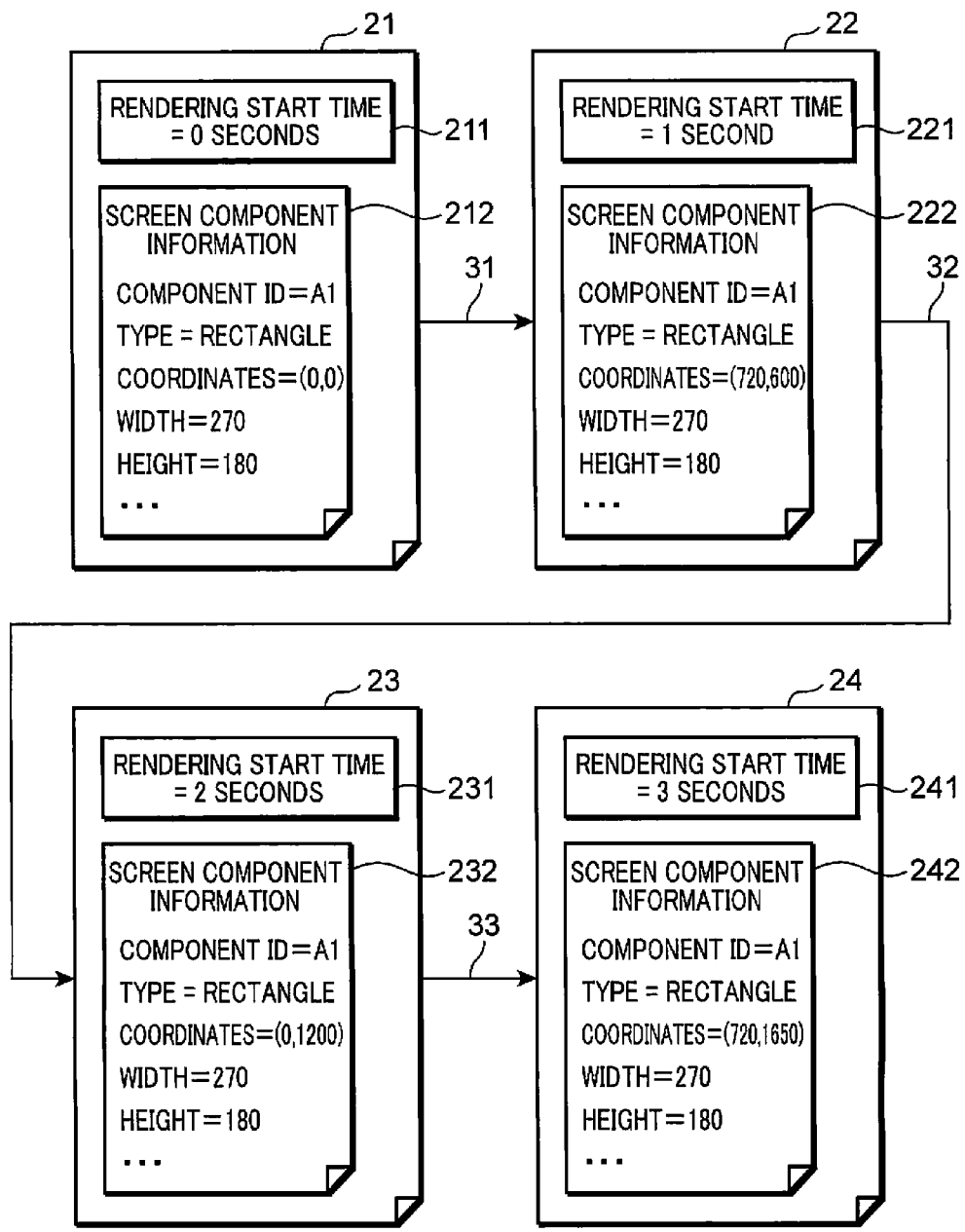
FIG. 2 is a diagram showing keyframe information according to the embodiment of the present invention.

FIG. 1 is a block diagram showing a configuration of an animation control apparatus according to an embodiment of the present invention. FIG. 2 is a diagram showing keyframe information. FIGS. 3 and 4 are diagrams showing keyframes expressed by the keyframe information shown in FIG. 2. An animation control apparatus 1 has a timer 11, a keyframe information storage unit 12, an animation controller 13, an interpolation component information creating unit 14, a rendering determination unit 15, a rendering time period computing unit 16, a rendering performance information storage unit 17, a display controller 18, and a frame buffer 19. A display unit 2 is configured by an LCD or CRT and is controlled by the animation control apparatus 1 to display, by animation, a screen component configuring a display screen. The screen component includes a character, a diagram, and other types of images.

The timer 11 is continuously operated to output current time information, which is utilized as a value indicating the standard for a process performed in the animation control apparatus 1. Note that the timer 11 may have a function to announce a set time. In this case, the set time may be used for expressing an animation rendering start time.

The keyframe information storage unit 12 stores, for example, a table of a plurality of keyframe information for realizing an animation display effect. As shown in FIG. 2, keyframe information 21 includes start time information 211 and screen component information 212. The start time information 211 expresses a rendering start time at which a frame rendering process should be started. For instance, the start time information 211 of the keyframe information 21 is set at 0 seconds, which expresses a frame that should be rendered at the same time as the start of animation display. The screen component information 212 expresses a screen component to be rendered in a frame and includes attribute information required to update the screen (more specifically, to display the screen component on the display unit 2), such as a component ID, which is for uniquely discriminating a plurality of screen components displayed on the screen, the type, the coordinates, the width and the height of the screen component. Keyframe information 22 to 24 also have the same configuration and are denoted with corresponding reference numerals in FIG. 2.

The keyframe information 21 to 24 are coupled consecutively by links and arranged in time series. In other words, the keyframe information 21 and 22 are coupled to each other by a link 31. The keyframe information 22 and 23 are coupled to each other by a link 32. The keyframe information 23 and 24 are coupled to each other by a link 33. The keyframe information 21, 22, 23, 24 that are coupled by the links retain time periods of 0, 1, 2 and 3 seconds as the start time information 211, 221, 231 and 241. Rendering processes for rendering the keyframe information 22, 23 and 24 are started 1, 2 and 3 seconds after a rendering process for rendering the keyframe information 21 is started at the start of animation display. Note that there are no subsequent links to couple the keyframe information 24, which means that the keyframe information 24 is the last information to be rendered.

Moreover, in the screen component information 212, 222, 232 and 242, the respective attributes such as the component ID (A1), the type (rectangle), the width (270), and the height (180) of the screen components are the same, but the coordinates are different. FIGS. 3A, 3B, 4A and 4B respectively illustrate situations in which key components 41 to 44 expressed by the screen component information 212, 222, 232 and 242 are rendered on the frame buffer 19 or the display unit 2. Note that in this embodiment, the frame buffer 19 and the display unit 2 have 1080×1920 pixels in a range of X, Y coordinates with a pixel of G0 (0, 0) on the upper left corner as the reference, and a pixel of G1 (1079, 1919) on the lower right corner. Animation display is realized by reflecting the changes in coordinate of this screen component information in the display screen of the display unit 2, as shown in FIGS. 3A, 3B, 4A and 4B.

The animation controller 13 acquires a current rendering start time and controls rendering of a frame at the acquired rendering start time. In this embodiment, normally the animation controller 13 acquires time information from the timer 11 upon completion of rendering a keyframe or an interpolation frame, and sets the acquired time as the current rendering start time. For example, when the start of animation display is instructed, the animation controller 13 instructs the display controller 18 to render a keyframe based on the keyframe information 21 expressing a frame to be rendered at the same time with the start of animation display. Once being notified of the completion of the keyframe rendering by the display controller 18, the animation controller 13 acquires a current time from the timer 11 and sets the acquired time as the current rendering start time. At this moment, the cause of the operation of the animation controller 13, which is the instruction of the start of animation display, may be notified by the timer 11, input by a user, or input from other control program.

After acquiring the current rendering start time, the animation controller 13 notifies the keyframe information storage unit 12 of a request of acquiring two pieces of keyframe information: keyframe information that includes a rendering start time prior to the current rendering start time, and keyframe information that includes a rendering start time following the current rendering start time. Next, the animation controller 13 notifies the interpolation component information creating unit 14 of these two pieces of keyframe information and the current rendering start time, of a request of creating interpolation component information, and acquires the created interpolation component information. The animation controller 13 then notifies the rendering determination unit 15 of a request of determining rendering of the interpolation component information. In so doing, the animation controller 13 notifies the rendering determination unit 15 of the current rendering start time, the interpolation component information, and the two pieces of keyframe information as well. The animation controller 13 then notifies the display controller 18 of the interpolation component information and of a request of rendering an interpolation component on the display unit 2, on the basis of the result of determining rendering of the interpolation component information by the rendering determination unit 15.

In response to the notification from the animation controller 13, the interpolation component information creating unit 14 creates interpolation component information. This interpolation component information is created, for example, through interpolation calculation using the current rendering start time and the screen component information that are included in the respective keyframe information of the rendering start times prior to and following the current rendering start time, the current rendering start time and the screen component information being acquired by the animation controller 13.

In response to the notification from the animation controller 13, the rendering determination unit 15 determines whether or not the rendering process for displaying, on the display unit 2, the interpolation component expressed by the interpolation component information created by the interpolation component information creating unit 14 is completed by the rendering start time that is included in the latter keyframe information of the two pieces of keyframe information. This determination uses a rendering time period estimate value that is acquired by notifying the rendering time period computing unit 16 of a request of calculation of the value.

The rendering performance information storage unit 17 stores a rendering performance information expressing the rendering process performance of the animation control apparatus 1 (more precisely, the display controller 18). In this embodiment, a rendering time period that is required to render a unit area (an area expressed by a number of pixels, in this embodiment) in the screen of the display unit 2 (the frame buffer 19) is stored as the rendering performance information. More specifically, a rendering time period=1 second, which is required to render a QHD (Quarter High Definition=960× 540), is stored as the rendering performance information in the rendering performance information storage unit 17. In response to the notification from the rendering determination unit 15, and on the basis of the rendering performance information stored in the rendering performance information storage unit 17, the rendering time period computing unit 16 calculates the rendering time period estimate value that is required in the rendering process for displaying, on the display unit 2, the interpolation component expressed by the interpolation component information created by the interpolation component information creating unit 14.

In response to the notification from the animation controller 13, the display controller 18 performs the rendering process of the interpolation component expressed by the interpolation component information, and the rendering process of the key components expressed by the screen component information included in the keyframe information, to update the frame buffer 19, and then displays the result of update on the display unit 2. The display controller 18 also notifies the animation controller 13 of the completion of the rendering processes of frames such as the keyframe and the interpolation frame.

Figure 5:
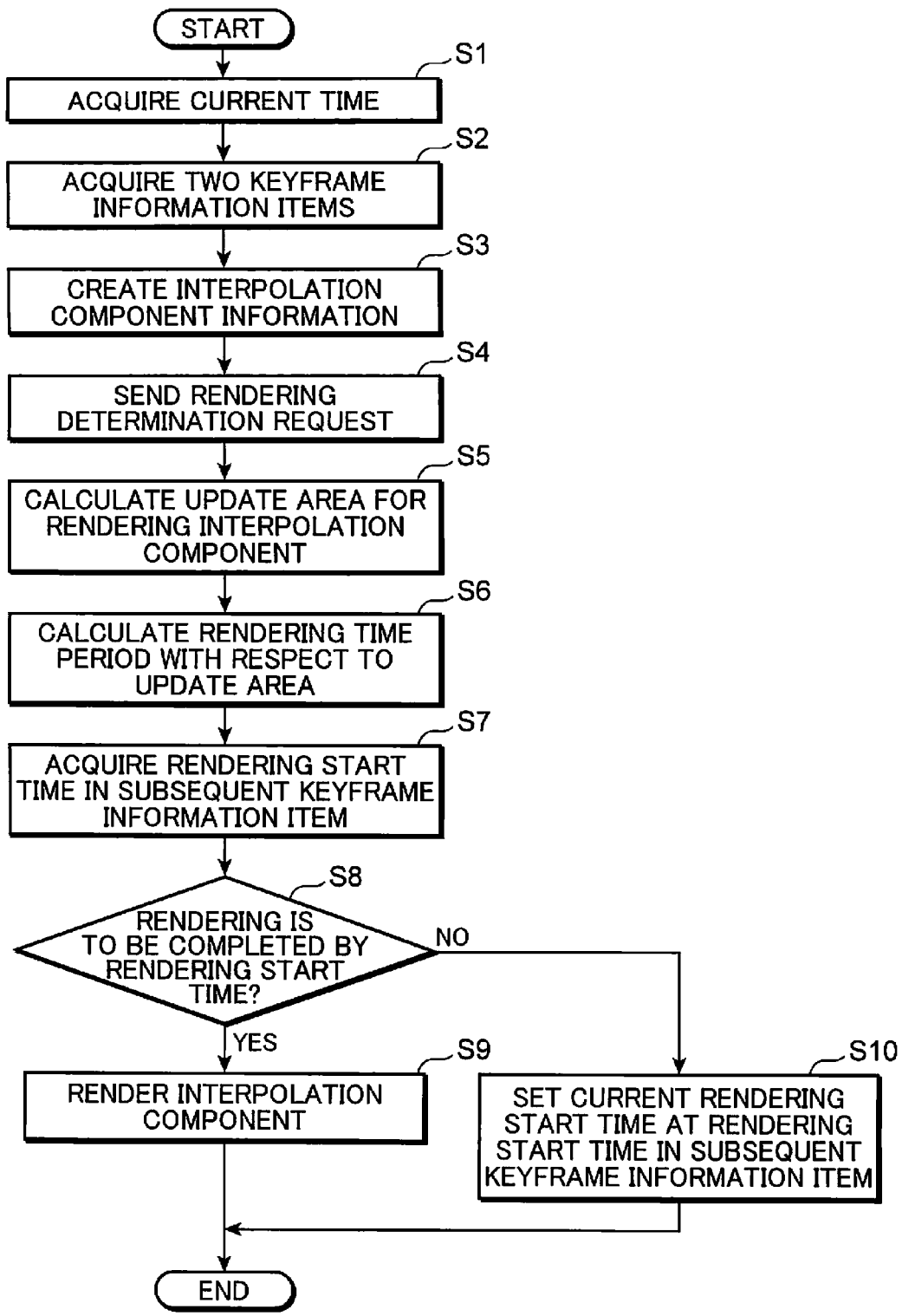
FIG. 5 is a flowchart showing a rendering operation for rendering an interpolation component, according to the embodiment of the present invention.

The operation of rendering the interpolation component according to the present embodiment is described next with reference to FIGS. 2, 3 and 5. FIG. 5 is a flowchart showing the operation of rendering the interpolation component.

Figure 3A:
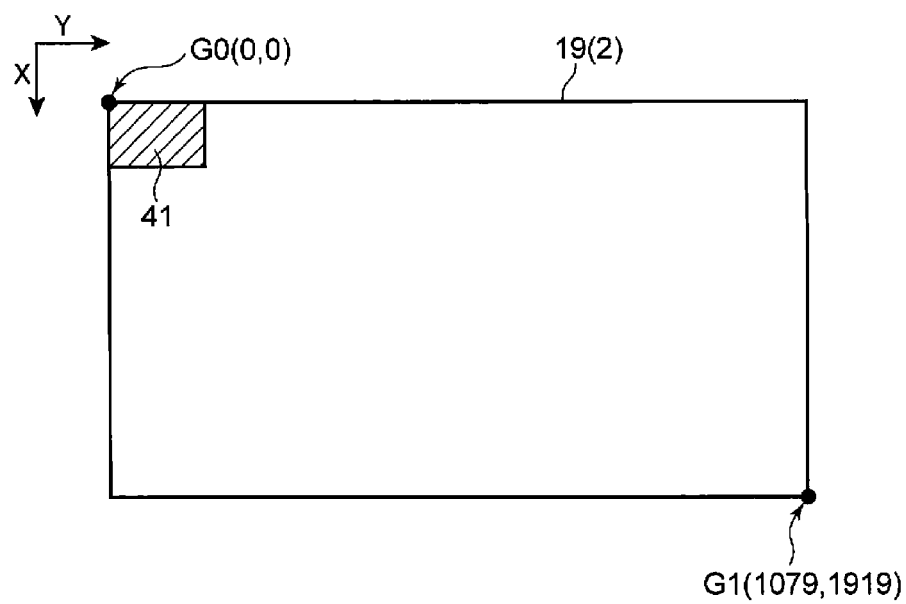
FIGS. 3A and 3B are diagrams showing keyframes expressed by the keyframe information shown in FIG. 2.
Figure 3B:
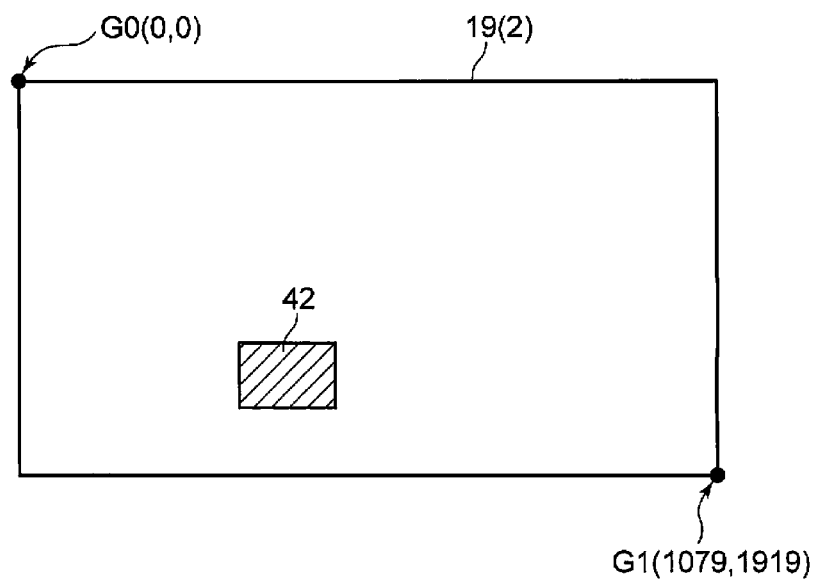
Figure 4A:
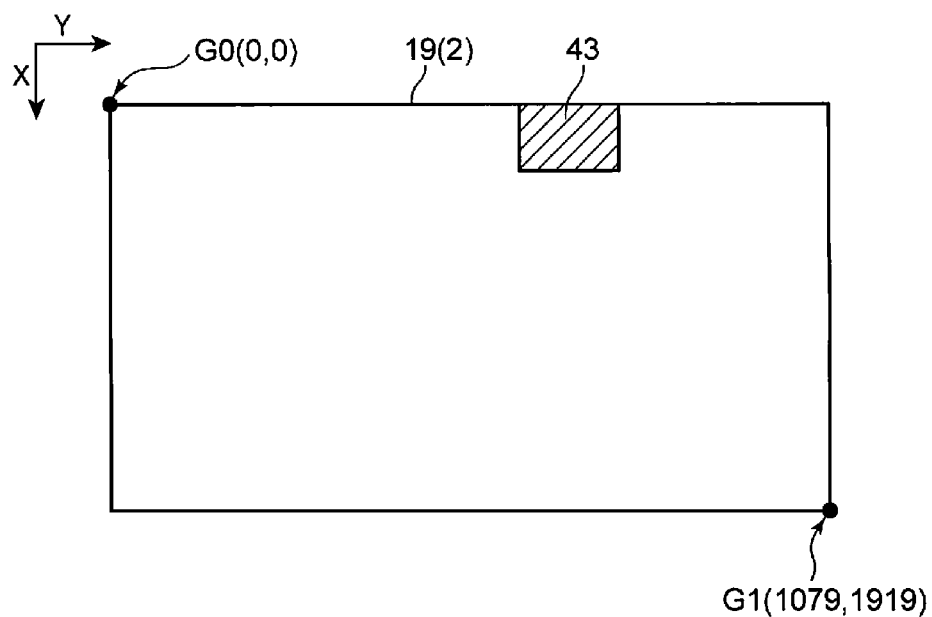
FIGS. 4A and 4B are diagrams showing keyframes expressed by the keyframe information shown in FIG. 2.
Figure 4B:
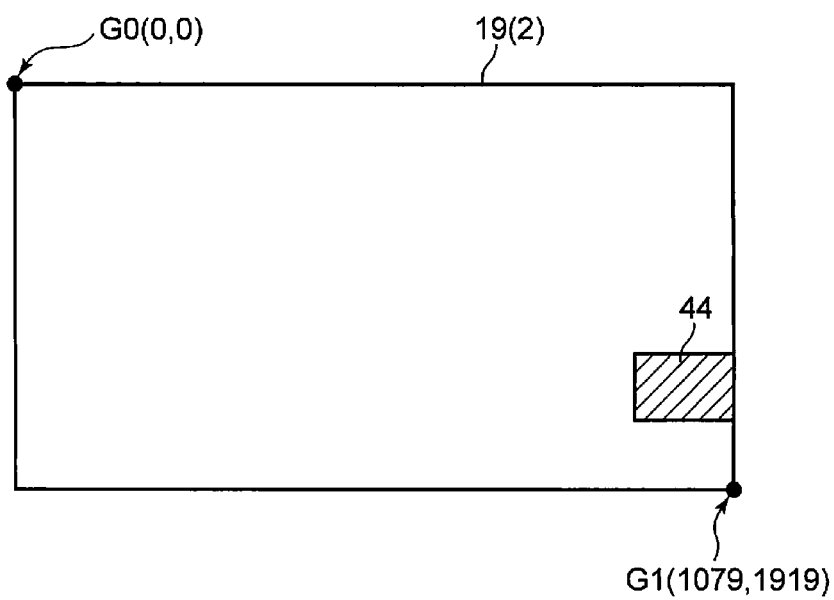

First of all, at the start of animation display, the animation controller 13 acquires, from the keyframe information storage unit 12, the keyframe information 21 (FIG. 2) that has the start time information 211 indicating the rendering start time information=0 seconds, and instructs the display controller 18 to perform the rendering process based on the screen component information 212. In accordance with this instruction, the display controller 18 generates a keyframe by rendering, on the frame buffer 19, the key component 41 based on the screen component information 212, and then displays thus obtained result on the display unit 2 (FIG. 3A).

In step S1 shown in FIG. 5, the animation controller 13 acquires a current time from the timer 11 as the rendering start time, as soon as receiving a notification of the completion of rendering the key component 41 (or the keyframe including the key component 41) from the display controller 18. Subsequently, in step S2 the animation controller 13 acquires, from the keyframe information storage unit 12, the two pieces of keyframe information that have the rendering start times prior to and following the current rendering start time. Immediately after the start of animation display, the keyframe information 21 used at the time of the start of animation display and the keyframe information 22 coupled to the keyframe information 21 by the link 31, are acquired.

Subsequently, in step S3, the animation controller 13 notifies the interpolation component information creating unit 14 of a request for creating the interpolation component information. In so doing, the animation controller 13 notifies the interpolation component information creating unit 14 of the current rendering start time acquired from the timer 11 in step S1, and the two pieces of keyframe information acquired from the keyframe information storage unit 12 in step S2. Then, on the basis of the current rendering start time and the two pieces of keyframe information having the rendering start times prior to and following the current rendering start time notified from the animation controller 13, the interpolation component information creating unit 14 creates the interpolation component information and notifies the animation controller 13 of the created interpolation component information.

After being notified of the completion of creating the interpolation component information, the animation controller 13 notifies, in step S4, the rendering determination unit 15 of a request for determining whether or not the rendering process for displaying, on the display unit 2, the interpolation component expressed by the created interpolation component information is completed by the rendering start time that is included in the latter keyframe information of the two pieces of keyframe information. In so doing, the animation controller 13 also notifies the rendering determination unit 15 of the created interpolation component information, the current rendering start time, and the keyframe information having the rendering start times prior to and following the current rendering start time. In response to this notification, the rendering determination unit 15 determines whether or not the estimate value of the time period for rendering the interpolation component expressed by the interpolation component information is completed by the rendering start time, included in the keyframe information, following the current rendering start time. For that, the rendering determination unit 15 notifies the rendering time period computing unit 16 of a request for estimating the rendering time period. In so doing, the rendering determination unit 15 also notifies the rendering time period computing unit 16 of the interpolation component information, the current rendering start time, and the keyframe information that includes the rendering start time prior to the current rendering start time.

After receiving a notification of a request for estimating the rendering time period, in step S5, the rendering time period computing unit 16 specifies, from the interpolation component information and a previous component information (in case of immediately after the start of animation display, the screen component information that is included in the keyframe information having the rendering start time prior to the current rendering start time), a screen region on the screen of the display unit 2 (frame buffer 19) in which attribute information such as the coordinates and the like change, and then calculates an update area that needs to be updated in order to render the current interpolation component.

Next, in step S6, the rendering time period computing unit 16 acquires the rendering performance information from the rendering performance information storage unit 17, and calculates the rendering time period estimate value for the calculated update area. The rendering time period computing unit 16 notifies the rendering determination unit 15 of the rendering time period estimate value. In response to the notification from the rendering time period computing unit 16, in step S7, the rendering determination unit 15 acquires the rendering start time included in the subsequent keyframe information.

Next, in step S8, the rendering determination unit 15 determines whether or not the rendering process for displaying, on the display unit 2, the interpolation component expressed by the interpolation component information is completed by the rendering start time included in the above-mentioned subsequent keyframe information. When it is determined that the rendering process is completed (YES in step S8), the rendering determination unit 15 notifies the animation controller 13 of that the interpolation component can be rendered.

In response to the notification that the interpolation component can be rendered from the rendering determination unit 15, in step S9, the animation controller 13 notifies the display controller 18 of a request for updating the screen in order to display the interpolation component expressed by the interpolation component information, on the display unit 2. In response to the notification, the display controller 18 performs the rendering process for displaying the interpolation component expressed by the interpolation component information, to render the interpolation component on the frame buffer 19, and updates the screen of the display unit 2 in order to display the resultant rendered contents.

When, on the other hand, the rendering determination unit 15 determines in step S8 that the rendering process for displaying, on the display unit 2, the interpolation component expressed by the interpolation component information is not completed by the rendering start time included in the subsequent keyframe information (NO in step S8), the rendering determination unit 15 notifies the animation controller 13 of that the interpolation component cannot be rendered. When the rendering determination unit 15 notifies the animation controller 13 of that the interpolation component cannot be rendered, the animation controller 13 may end the process without instructing the display controller 18 to render the interpolation component. In this embodiment, however, the timer 11 is set such that the current rendering start time indicates the rendering start time of the subsequent keyframe information (step S10), so that the process is ended without executing unnecessary processes.

When the rendering start time of the subsequent keyframe information is reached, the animation controller 13 instructs the display controller 18 to render a keyframe based on the subsequent keyframe information. In response to this instruction, the display controller 18 renders on the frame buffer 19 the keyframe based on the subsequent keyframe information, and displays the resultant rendered contents on the display unit 2. When the rendering of the keyframe is completed, the display controller 18 notifies the animation controller 13 accordingly.

Figure 6:
FIG. 6 shows a conversion table according to the embodiment of the present invention.
Figure 7A:
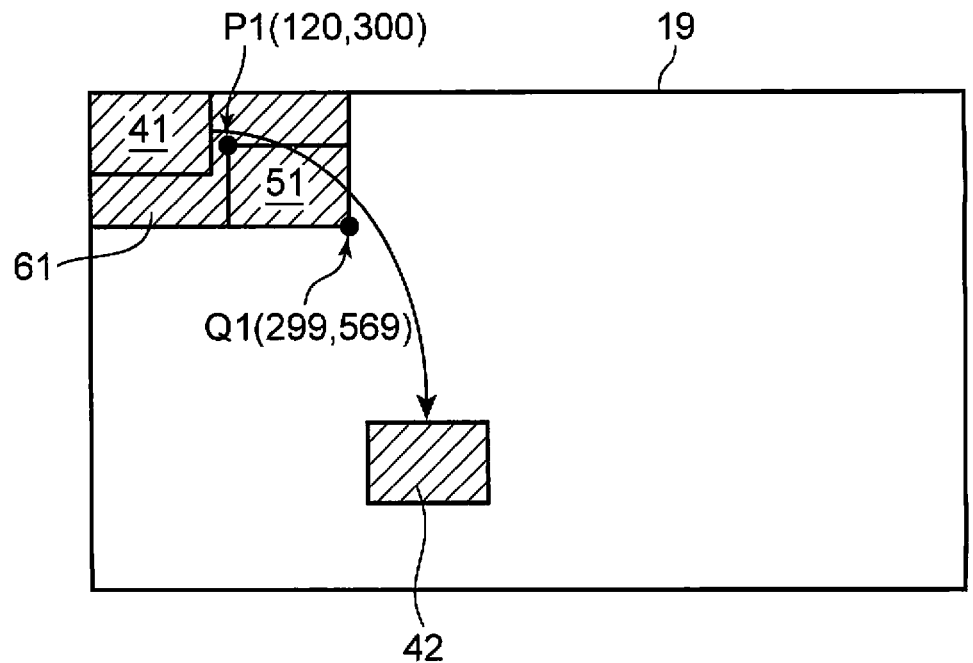
FIGS. 7A and 7B are diagrams for illustrating update areas according to the embodiment of the present invention.
Figure 7B:
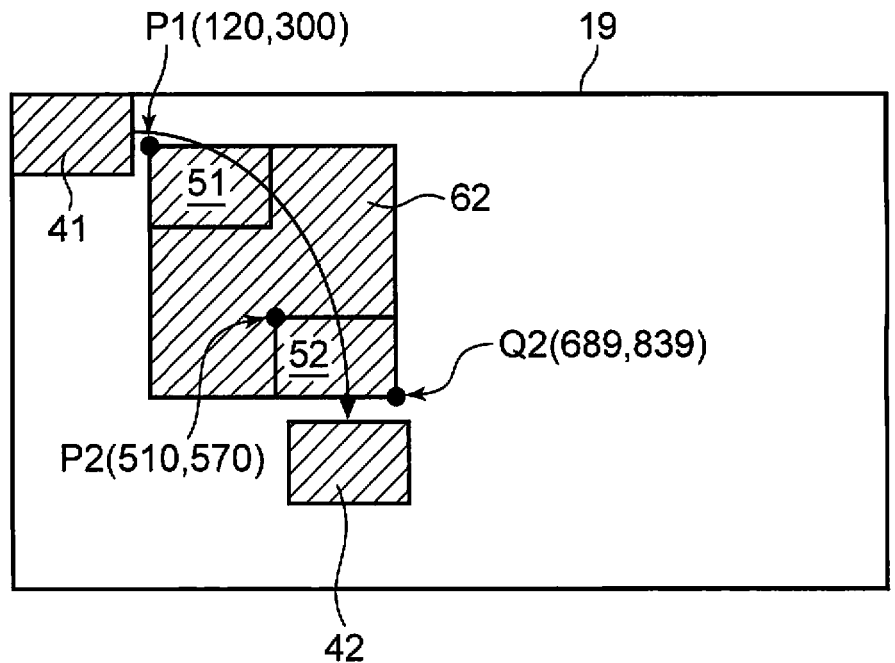
Figure 8:
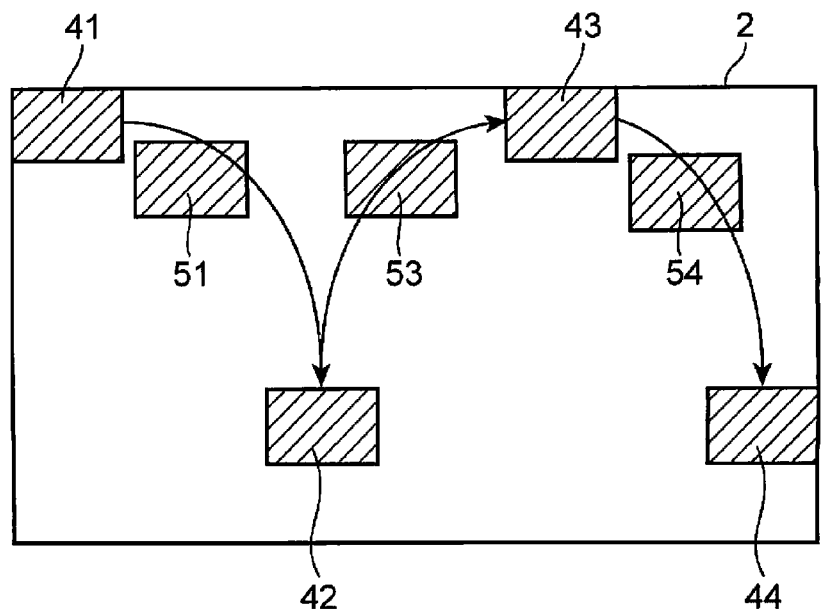
FIG. 8 is a diagram showing a trajectory displayed by animation, according to the embodiment of the present invention.

Next, with reference to FIGS. 6 to 8, specific examples of rendering interpolation components by animation based on the keyframe information 21 to 24 are described. FIG. 6 is a diagram showing a conversion table used for creating the interpolation component information. FIGS. 7A and 7B are diagrams for illustrating the update areas for displaying the interpolation components. FIG. 8 is a diagram showing a trajectory displayed by animation. The following describes an example in which a trajectory expressed by the model of a falling object is displayed by animation.

The interpolation component information creating unit 14 uses a conversion table 35 of FIG. 6 to create the interpolation component information (step S3 in FIG. 5). The conversion table 35 is a table of pairs of h and k prepared in advance. The value h indicating "the position of an interpolation component to be rendered subsequently" is calculated in advance. The value k is predetermined, with respect to the respective values of h, indicating an actual change amount at the time. A relation of $k=h^2$ is established with respect to h in the conversion table 35 shown in FIG. 6, in order to display by animation the trajectory expressed by the model of a falling object. The interpolation component information creating unit 14 selects h of the conversion table 35 from the relationship between the current rendering start time and the rendering start times included in the keyframe information 21, 22 (0 seconds and 1 second), and uses k corresponding to the selected h, to calculate the position of rendering the interpolation component information.

Next, on the basis of the interpolation component information created by the interpolation component information creating unit 14, the rendering time period computing unit 16 calculates the update area (step S5 in FIG. 5). FIG. 7A shows the update area at the time immediately after the start of animation display. For the explanatory convenience, FIG. 7A shows a situation in which the key component 41 based on the keyframe information 21, an interpolation component 51 based on the created interpolation component information, and the key component 42 based on the keyframe information 22, are rendered on the frame buffer 19, and FIG. 7B shows a situation in which the key component 41 based on the keyframe information 21, interpolation components 51, 52 based on the created interpolation component information, and the key component 42 based on the keyframe information 22, are rendered on the frame buffer 19.

As shown in FIG. 7A, the interpolation component 51 based on the interpolation component information created in step S3 has a width of 270, a height of 120, a coordinate P1 (120, 300) on the upper left corner, and a coordinate Q1 (299, 569) on the lower right corner. In this embodiment, rectangular regions that include regions to be rendered are defined as update regions. Therefore, the area of an update region 61 that includes the key component 41 and the interpolation component 51 is obtained as an area with (300×570), when the area is expressed in the number of pixels.

Subsequently, the rendering time period computing unit 16 calculates the rendering time period based on the update area (step S6 in FIG. 5). In the present embodiment, the rendering time period of 1 second for rendering the QHD (960×540) is stored as the performance information, as described above. When the update area for rendering the interpolation component is (300×570), a rendering time period of 0.33 seconds can be estimated based on the area ratio.

Next, the rendering determination unit 15 acquires the rendering start time retained by the subsequent keyframe information, to determine whether the interpolation component can be rendered or not (steps S7, S8 in FIG. 5). Suppose here that the rendering start time (1 second) that is retained by the keyframe information 22 having the rendering start time following the current rendering start time starts 0.9 seconds after the current rendering start time. In this case, because the rendering time period estimated by the rendering time period computing unit 16 is 0.33 seconds, the time period remaining until the rendering start time included in the keyframe information is 0.9 seconds or less. Thus, in the case of FIG. 7A, the rendering determination unit 15 notifies the animation controller 13 of that the interpolation component can be rendered. As a result, the interpolation component 51 is displayed on the display unit 2 by the display controller 18.

Next, upon completion of rendering the interpolation component 51, a new current rendering start time is acquired. Then, the subsequent interpolation component information is created using the new current rendering start time, the keyframe information 21, 22, and the conversion table 35.

Here, suppose that the interpolation component 52 based on the subsequent interpolation component information has a coordinate P2 (510, 570) on the upper left corner and a coordinate Q2 (689, 839) on the lower right corner, as shown in FIG. 7B. Note that the interpolation component 52 has a width of 270 and a height of 180, as with the interpolation component 51. In this case, an update region 62 is a region that includes the interpolation component 51 and the interpolation component 52, since it is not immediately after the time of animation display and the interpolation component 51 is already created. The area of this update region 62 expressed in the number of pixels is obtained as (570×540), from the coordinate P1 (120, 300) of the interpolation component 51 and the coordinate Q2 (689, 839) of the interpolation component 52. As a result, the rendering time period is estimated to be 0.59 seconds, based on the area ratio.

Suppose here that the rendering start time (1 second) that is retained by the keyframe information 22 having the rendering start time following the current rendering start time starts 0.57 seconds after the current rendering start time. In this case, because the rendering time period estimated by the rendering time period computing unit 16 is 0.59 seconds, the time period remaining until the rendering start time included in the keyframe information 22 exceeds 0.57 seconds. Therefore, in the case of FIG. 7B, the rendering determination unit 15 notifies the animation controller 13 of that the interpolation component cannot be rendered. As a result, the interpolation component 52 is not rendered, and the key component 42 based on the keyframe information 22 is subsequently rendered by the display controller 18.

Upon completion of rendering the key component 42, the interpolation component information is created based on the keyframe information 22, 23, and whether the interpolation component based on this interpolation component information can be rendered or not is subsequently determined. Then, as shown in FIG. 8, an interpolation component 53, for example, is rendered, and the key component 43 based on the keyframe information 23 is subsequently rendered. After the key component 43 is rendered, then the interpolation component information based on the keyframe information 23, 24 is created, and whether the interpolation component based on this interpolation component information can be rendered or not is determined. Then, an interpolation component 54, for example, is rendered, and then the key component 44 based on the keyframe information 24 is rendered. After the key component 44 is rendered, this animation process is ended because there are no subsequent links to couple the keyframe information 24.

In this manner, as shown in FIG. 8, the key component 41 to 44 based on the keyframe information 21 to 24 are rendered reliably, and all the interpolation components 51, 53, 54 possible are rendered with the key components 41 to 44 are rendered.

As described above, according to this embodiment, the interpolation component information is created based on the keyframe information 21, 22. Based on this interpolation component information and the rendering performance information, it is determined whether the rendering process for displaying, on the display unit 2, the interpolation component expressed by the interpolation component information is completed or not by the rendering start time of the subsequent keyframe information 22. When it is determined that the rendering process is not completed, the rendering process for displaying the interpolation component on the display unit 2 is not performed. When the rendering start time of the subsequent keyframe information 22 is reached, the rendering process for displaying, on the display unit 2, the key component 42 expressed by the screen component information 222 of the keyframe information 22 is started. Therefore, reliably displaying the key component 42 based on the keyframe information 22 on the display unit 2 can prevent the animation trajectory from deforming.

In addition, according to this embodiment, when it is determined that the rendering process for displaying, on the display unit 2, the interpolation component expressed by the interpolation component information is completed by the rendering start time of the subsequent keyframe information 22, the rendering process for displaying the interpolation component on the display unit 2 is started. Thus, interpolation components can be displayed on the display unit 2 as much as possible, while preventing the animation trajectory from deforming, so that an animation with a smooth trajectory can be displayed.

The embodiment described above is merely an example, and therefore the present invention is not limited thereto. The present invention includes embodiments that are obtained by those skilled in the art by modifying the above-described embodiment, as well as other embodiments having arbitrary combinations of the constituent parts of the above-described embodiment.

In the embodiment described above, the animation controller 13 uses, as-is, the screen component information included in the keyframe information. In other words, as shown in FIG. 7A, the key component 41 with the set width and height is rendered as-is, in the coordinates set in, for example, the screen component information 212 shown in FIG. 2. On the other hand, the animation controller 13 may function to change part of the screen component information included in the keyframe information. When the animation controller 13 changes part of the screen component information and uses the resultant screen component information, various key components can be rendered by the display controller 18. An embodiment for changing part of the screen component information is described hereinafter with reference to FIGS. 9 and 10.

Figure 9:
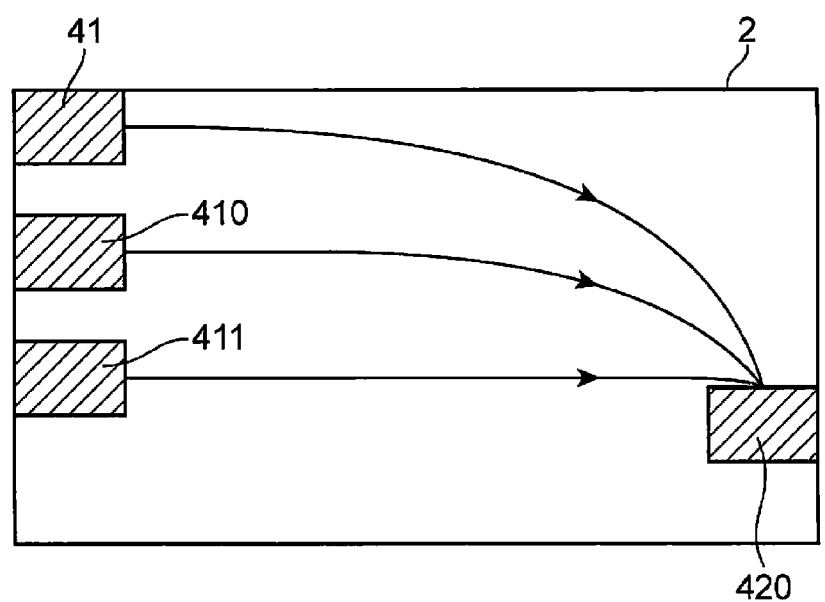
FIG. 9 is a diagram showing an example in which part of screen component information is changed and used for animation display.
Figure 10:
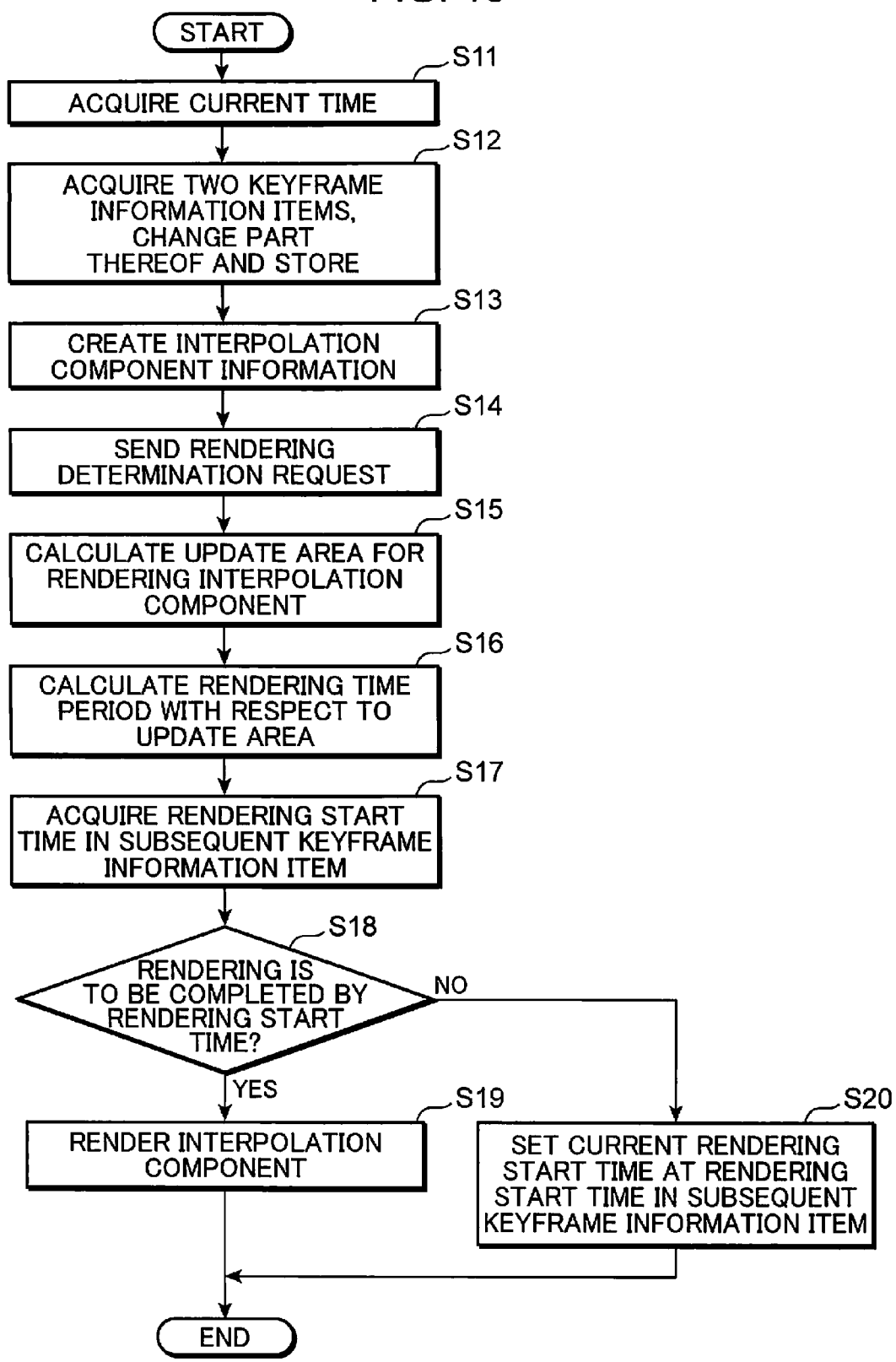
FIG. 10 is a flowchart showing a rendering operation for rendering the interpolation component that is obtained in the embodiment shown in FIG. 9.

FIG. 9 is a diagram showing an example of changing part of the screen component information included in the keyframe information and then using the resultant screen component information for animation display. FIG. 10 is a flowchart showing an operation for rendering the interpolation components obtained in the embodiment shown in FIG. 9. In FIG. 9, the key component 41 is rendered as a result of using, as-is, the screen component information 212 included in the keyframe information 21. Key components 410, 411 are rendered by partially changing the screen component information 212 included in the keyframe information 21. In other words, the key components 410, 411 are rendered by shifting the coordinates thereof described in the screen component information 212 in a +X direction, without changing the types, widths and the heights described in the screen component information 212, and are components obtained by shifting the key component 41 in the +X direction.

The key component 420 is rendered by changing a part of the screen component information 222 that is included in the keyframe information 22 coupled to the keyframe information 21 by the link 31. In other words, the key component 420 is rendered by changing the coordinates thereof described in the screen component information 222 in a +Y direction, without changing the type, the width and the height described in the screen component information 222, and is a component obtained by shifting the key component 42 (FIG. 8, for example) in the +Y direction.

As described above, in FIG. 9, the key components 410, 411, 420 are rendered by partially changing the screen component information 212, 222 of the keyframe information 21, 22 that are coupled to each other by the link 31, and then using the resultant screen component information. As a result, by using the same keyframe information 21, 22, not only the trajectory between the key component 41 and the key component 42 shown in FIG. 8, but also three trajectories, which are the trajectory between the key component 41 and the key component 420, the trajectory between the key component 410 and the key component 420, and the trajectory between the key component 411 and the key component 420, are displayed by animation.

In FIG. 10, step S11 is the same as step S1 shown in FIG. 5. In step S12, the animation controller 13 acquires two pieces of keyframe information from the keyframe information storage unit 12, changes part of the screen component information of these keyframe information, and saves the resultant screen component information in the keyframe information storage unit 12.

The subsequent steps S13 to S20 are the same as steps S3 to S10 shown in FIG. 5. In other words, when, for example, displaying the trajectory between the key component 410 and the key component 420 by animation, the resultant screen component information saved in the keyframe information storage unit 12, which are the screen component information expressing the key components 410, 420, are used for creating the interpolation component information. Furthermore, the update area and the rendering time period are calculated, and it is determined whether the rendering process for displaying the interpolation component on the display unit 2 is completed by the rendering start time expressed by the start time information 221 of the keyframe information 22. When it is determined that the rendering process is completed by the rendering start time, the interpolation component is rendered. When it is determined that the rendering process is not completed by the rendering start time, the display controller waits without rendering the interpolation component, and then, when the rendering start time of the keyframe information 22 is reached, uses the resultant screen component information saved in the keyframe information storage unit 12, to render the key component 420.

As described above, in the embodiment shown in FIGS. 9 and 10, various key components can be rendered without increasing the number of keyframe information stored in the keyframe information storage unit 12. Therefore, only the keyframe information having basic trajectory patterns may be stored in the keyframe information storage unit 12.

Note that, in FIG. 9, the animation controller 13 changes only the coordinates described in the screen component information 212, 222 of the keyframe information 21, 22. Thus, not the sizes of the key components but the distances between the key components are changed. In other words, for example, the distance between the key component 411 and the key component 420 is greater than the distance between the key component 41 and the key component 42 shown in FIG. 8. However, various modifications where the widths and the heights of the key components are changed or the distances between the key components are reduced, can be considered.

Because these various modifications can be considered, it is virtually impossible to determine in advance the number of interpolation components to be rendered between two key components expressed by the keyframe information or to determine the rendering start time. Therefore, in the embodiment shown in FIG. 9, the rendering start time for rendering the interpolation components is inevitably set in real time, as in the embodiment described above. In other words, the rendering start time for rendering the interpolation component is inevitably set dynamically, upon completion of rendering the key component based on the first keyframe information or upon completion of rendering the interpolation component that is determined to be renderable. Consequently, it is extremely important to determine whether or not the rendering process for displaying the interpolation component on the display unit 2 is completed by the rendering start time of the subsequent keyframe information.

Specifically, as long as the number of interpolation components to be rendered between two key components expressed by the keyframe information and the rendering start time can be determined in advance, it is only necessary to determine them so that the key components can always be rendered, and it is no longer necessary to determine whether the interpolation components can be rendered or not.

However, in the case where the start time for rendering the interpolation components is dynamically set, if it is not determined whether or not the process for rendering the interpolation component is completed by the rendering start time of the subsequent keyframe information, it is possible that the start time for rendering the subsequent keyframe information is passed during the process for rendering the interpolation components, as described in the chapter "Background Art."

Therefore, as in the embodiment shown in FIGS. 9 and 10, in the embodiment in which the keyframe information stored in the keyframe information storage unit 12 are changed and used, particularly, the advantageous effect, obtained by determining whether or not the rendering process for displaying the interpolation components on the display unit 2 is completed by the rendering start time of the subsequent keyframe information and by not rendering the interpolation components when it is determined that the rendering process cannot be completed by the rendering start time, is high.

Moreover, in the embodiment described above, renderable interpolation components are always rendered; however, as a varied configuration, rendering them may be omitted even if rendering of interpolation components is possible. For instance, when the keyframe information used for rendering are reduced from the basic keyframe information stored in the keyframe information storage unit 12, the interpolation components are rendered according to the granularity the user cannot feel the effect. In this case, the process for rendering the interpolation components may be omitted. An embodiment for determining whether to omit the interpolation components or not is described hereinafter with reference to FIGS. 11 and 12.

Figure 11:
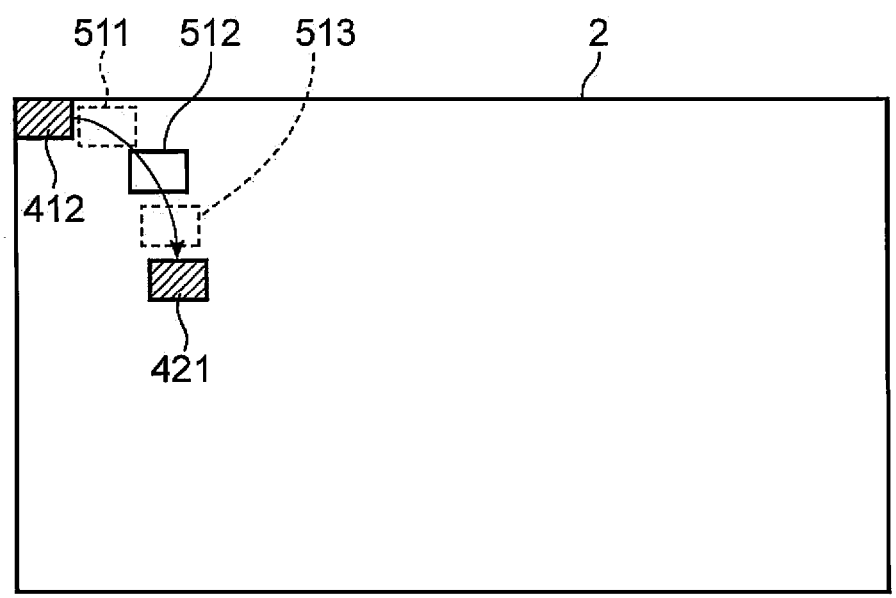
FIG. 11 is a diagram showing an example in which part of screen component information is changed and used for animation display.
Figure 12:
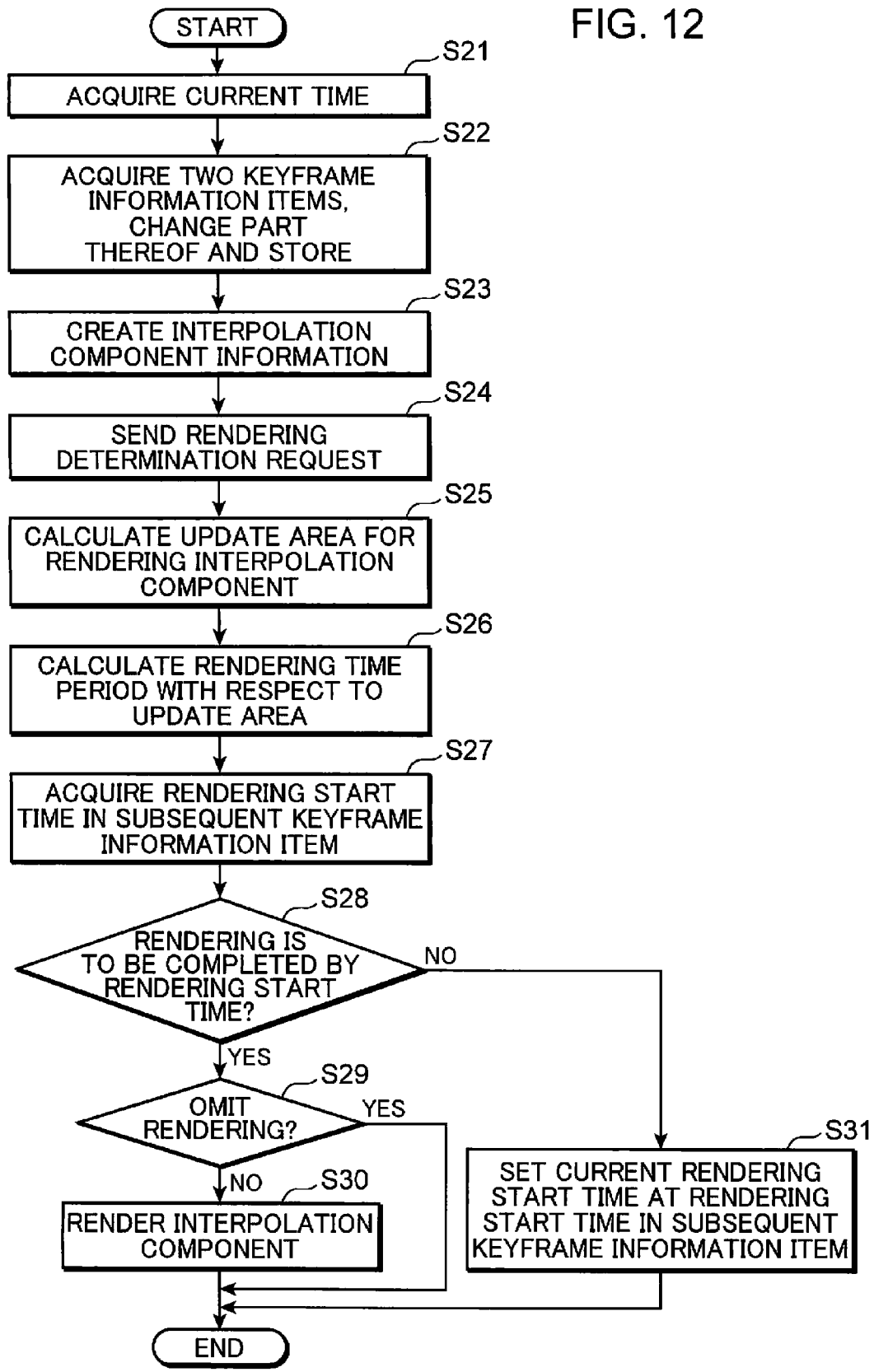
FIG. 12 is a flowchart showing a rendering operation for rendering the interpolation component that is obtained in the embodiment shown in FIG. 11.

FIG. 11 is a diagram showing an example in which the screen component information included in the keyframe information are reduced and displayed by animation. FIG. 12 is a flowchart showing an operation for rendering the interpolation components in the embodiment shown in FIG. 11. In FIG. 11, the screen component information 212, 222 of the keyframe information 21, 22 that are coupled to each other by the link 31 are reduced based on the coordinates (0, 0) of the screen component information 212, and the resultant screen component information are used for rendering the key components 412, 421.

In the embodiment shown in FIG. 11, the rendering determination unit 15 determines whether to render the interpolation components or to omit rendering the interpolation components, and has a memory that retains a determination parameter used for determining whether or not to omit the interpolation components. For example, the memory of the rendering determination unit 15 retains, as the determination parameter, a moving distance of the screen components between the frames (e.g., 10 pixels). When the moving distance between the screen component in the frame having the rendering start time prior to the current rendering start time and the interpolation component expressed by the created interpolation component information, is less than the determination parameter (e.g., 10 pixels), the rendering determination unit 15 determines to omit the interpolation component.

In FIG. 12, step S21 is the same as step S1 shown in FIG. 5. In step S22, the animation controller 13 acquires two pieces of keyframe information from the keyframe information storage unit 12, changes part of the screen component information thereof, and saves the resultant screen component information in the keyframe information storage unit 12.

The subsequent steps S23 to S28 are the same as steps S3 to S8 shown in FIG. 5. In other words, the interpolation component information creating unit 14 creates the interpolation component information using the screen component information obtained as a result of changing part of the keyframe information 21, 22, which are the screen component information expressing the key components 412, 421. In FIG. 11, an interpolation component 511 rendered based on this interpolation component information is shown in a dashed line. Moreover, the update area and the rendering time period are calculated, and then it is determined whether or not the rendering process for displaying the interpolation component on the display unit 2 is completed by the rendering start time expressed by the start time information 221 of the keyframe information 22.

When it is determined that the rendering process is completed (YES in step S28), the rendering determination unit 15 determines, based on the determination parameter, whether to omit the interpolation component expressed by the interpolation component information (step S29). When, for example, the moving distance between the key component 412 and the interpolation component 511 is less than 10 pixels, the rendering determination unit 15 determines to omit the interpolation component (YES in step S29), and ends the process without rendering the interpolation component. However, when the above-mentioned distance is equal to or greater than 10 pixels, the rendering determination unit 15 determines not to omit the interpolation component (NO in step S29) and proceeds to step S30. Steps S30, S31 are the same as steps S9, S10 shown in FIG. 5.

When the distance between the key component 412 and the interpolation component 511 is less than 10 pixels, the rendering determination unit 15 determines to omit the interpolation component and the interpolation component 511 is not rendered. Once it is determined that the interpolation component is omitted, the current time is acquired from the timer 11 and used as a new rendering start time, which is used by the interpolation component information creating unit 14 to create a subsequent interpolation component information. In FIG. 11, an interpolation component 512 based on this subsequent interpolation component information is shown in a solid line. When the distance between the key component 412 and the interpolation component 512 is equal to or greater than 10 pixels, the rendering determination unit 15 determines not to omit the interpolation component and consequently the interpolation component 512 is rendered. Similarly, in FIG. 11, an interpolation component 513 based on a subsequent interpolation component information is shown in a dashed line. When it is determined that the process for rendering the interpolation component 513 is not completed by the rendering start time included in the keyframe information 22, naturally the interpolation component 513 is not rendered. Even when it is determined that the rendering process is completed by this rendering start time, the rendering determination unit 15 determines to omit the interpolation component as long as the moving distance between the interpolation component 512 and the interpolation component 513 is less than 10 pixels, and the interpolation component 513 is not rendered.

Note that there may be a plurality of the parameters to determine whether or not to omit the interpolation components. For example, when a distance of 10 pixels and a rotation amount of 20 degrees are set as the determination parameters, and even when the distance of a screen component between a previous frame of the current rendering start time and an interpolation frame is less than 10 pixels, the rendering determination unit 15 may determine not to omit the interpolation frame, as long as the rotation amount is 30 degrees.

Examples of the determination parameters include a parallel distance and a rotation amount with respect to a position, a change in transparency, a change in overlap in a depth direction of a screen component to be displayed, and the like, and a combination thereof may be used. In other words, a parameter may be used that is able to determine whether or not rendering of the interpolation components provides the user with the effect of displaying a smooth animation trajectory.

According to the embodiment described with reference to FIGS. 11 and 12, when the user cannot see the effect of displaying a smooth animation trajectory, the interpolation components are omitted so that the CPU resources are not wasted. Therefore, the balance between displaying a smooth animation trajectory and improving the efficiency of the use of the CPU resources can be achieved.

Figure 13A:
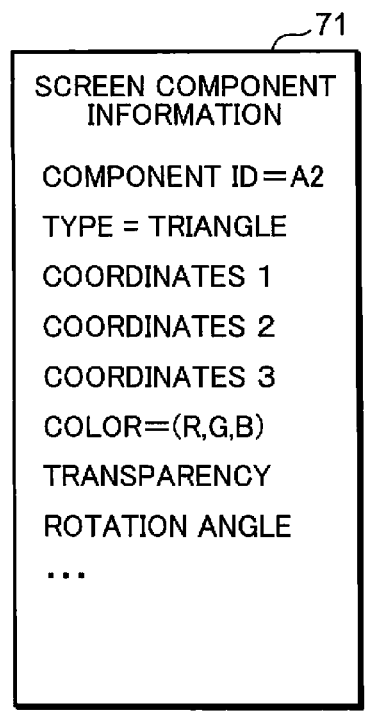
FIGS. 13A and 13B are diagrams showing another example of the screen component information.
Figure 13B:
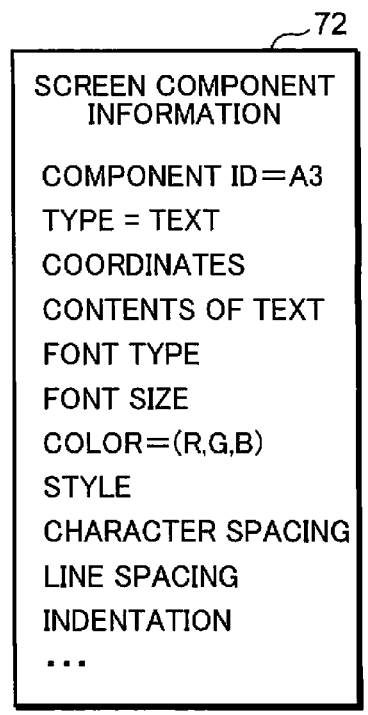
Figure 14:
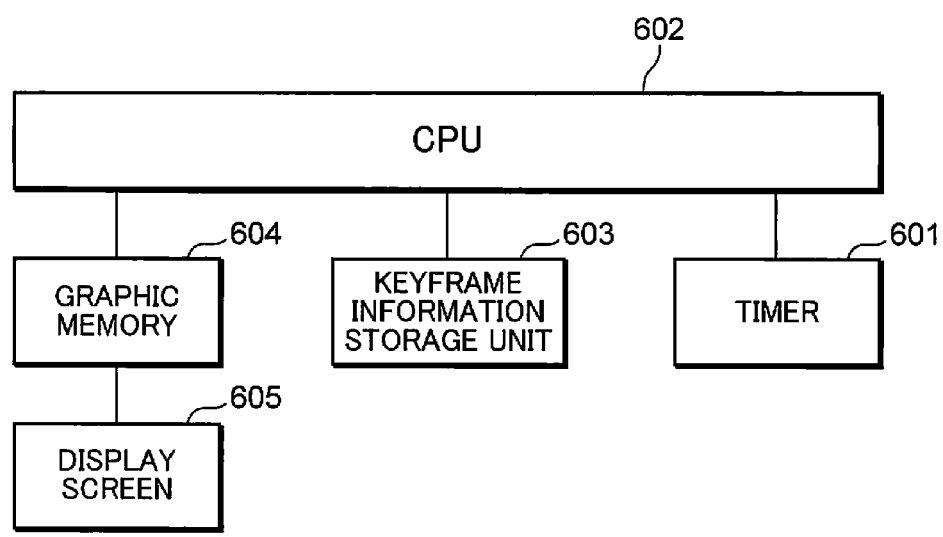
FIG. 14 is a block diagram showing a configuration of the conventional apparatus.
Figure 15A:
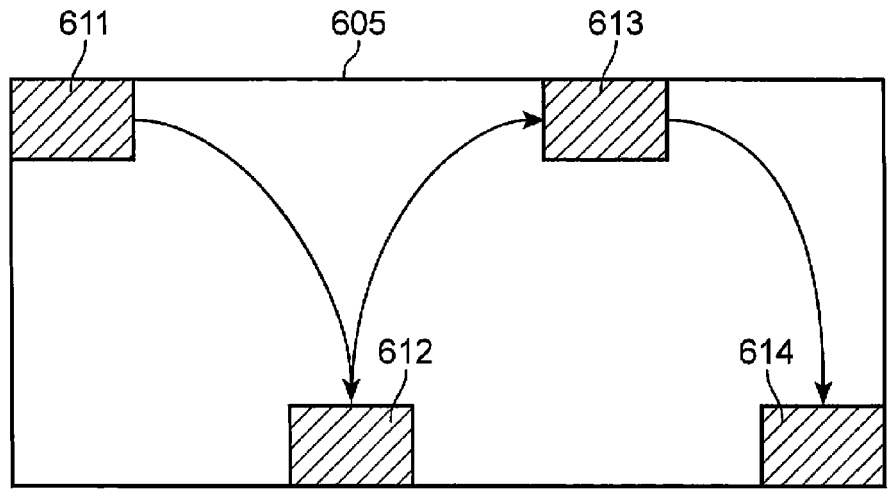
FIGS. 15A, 15B and 15C are diagrams for illustrating the problems encountered in the conventional apparatus.
Figure 15B:
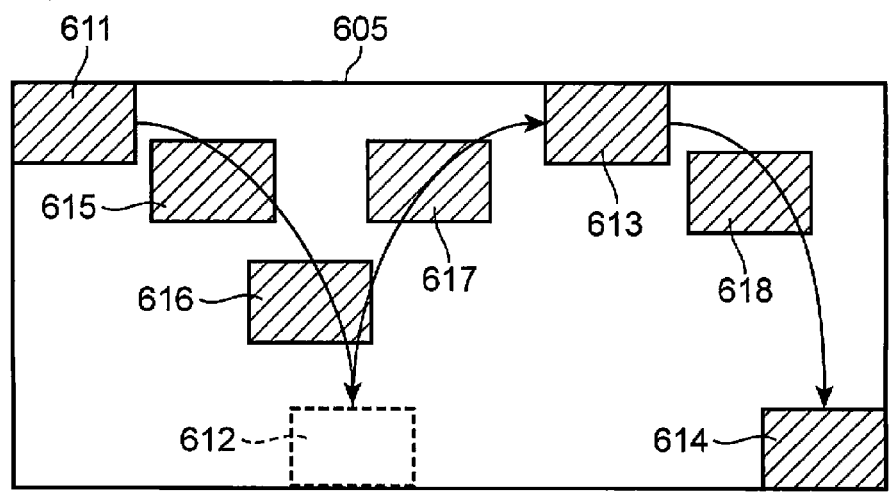
Figure 15C:
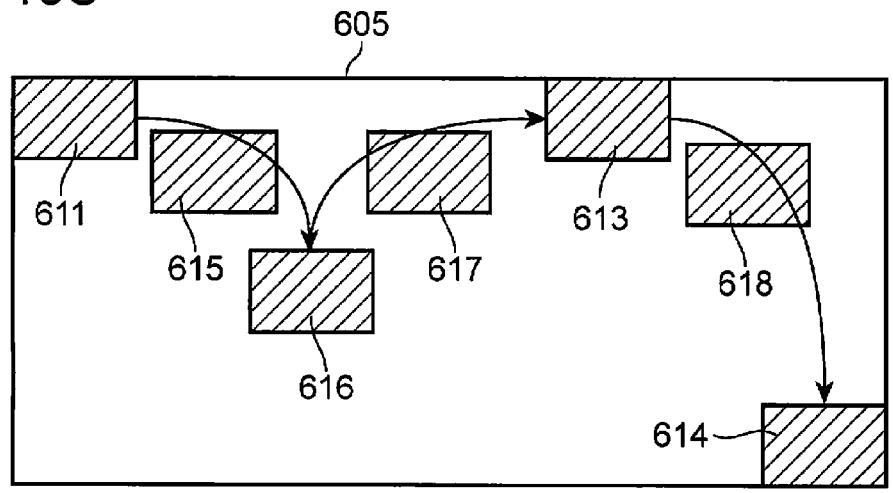

Furthermore, in the embodiment described above, the screen component information 212 to 242 retain the types, the coordinates, the widths and the heights as the attribute information, and the screen components are specified based on these attribute information; however, the screen component information may retain other attribute information. For instance, a screen component information 71 shown in FIG. 13A has three coordinates as coordinates of the feature points of the screen component, whereby the screen component (type=triangle) is specified. The screen component information 71 further retains a rotation angle and transparency as the attribute information. A screen component information 72 shown in FIG. 13B has a text set as the type thereof, and retains a font size and the like for displaying the text, as the attribute information. The screen component information may also retain, as the attribute information, information about not only a single screen component but also a component group configured by a group of basic components.

Moreover, in the embodiment described above, the screen component information 212, 222, 232, 242 are included directly in the keyframe information 21, 22, 23, 24; however, the screen component information may not necessarily be included directly in the keyframe information. For example, a single screen component information may be saved in the keyframe information storage unit 12, and the corresponding keyframe information may include only an ID that specifies the corresponding screen component information. In this embodiment, the animation controller 13 may separately acquire the attribute information of a screen component (a character, a figure, etc.), required in rendering, on the basis of the ID that specifies the screen component information included in the corresponding keyframe information. In this manner, the same operation effects as those of the above-described embodiment can be obtained, even when the keyframe information indirectly include the screen component information by means of the IDs for specifying the screen component information.

In the embodiment described above, the rendering performance information storage unit 17 stores a time period required to render a unit rendering area, as the rendering performance information expressing the rendering process performance; however, the rendering performance information storage unit 17 may store more detailed rendering performance information in order to improve the accuracy of the rendering time period estimate value. For example, a time period that is required in a rendering process for moving parallel or rotating a screen component in relation to a position, a time period that is required in color composition computation such as adding and subtracting colors with respect to the transparency, a time period that is required in computation for determining an overlap of screen components in the depth direction, a time period that is required in unique computation according to the types of screen components, a time period that is required in rendering a character obtained according to a font size, and a time period that is required in a calculation process for calculating a subordinate relationship between composite components having combinations of a plurality of screen components or a subordinate relationship between individual screen components, may be stored in the rendering performance information storage unit 17 as the rendering performance information. This allows the rendering time period computing unit 16 to calculate a more accurate rendering time period estimate value.

Result information about the time periods required to render the interpolation components may be sequentially added to the rendering performance information storage unit 17. Even when the rendering time period estimate value is calculated, the rendering process might not progress according to the estimate value, depending on the condition of the entire animation control apparatus 1. In such a case, rendering of the key components based on the keyframe information might fail to be performed. For example, when an estimate value of a rendering time period of 0.17 seconds is calculated and the rendering process for rendering an actual interpolation component is completed 0.25 seconds thereafter as a result of failing to perform the rendering process for rendering the key components based on the keyframe information, which is supposed to be performed 0.2 seconds after the calculation, an offset of 0.08 seconds, which is a difference between the estimate value and a result value, may be registered in the rendering performance information storage unit 17.

In the embodiment described, the interpolation component information creating unit 14 creates the interpolation component information by performing nonlinear interpolation using the conversion table 35; however, the interpolation component information may be created by linear interpolation. Furthermore, in the embodiment described above, the conversion table 35 is created by establishing the above-described quadratic relationship as k with respect to h. When using the conversion table, the values k can be defined arbitrarily by an animation creator, regardless of the functional relationship, so as to be able to realize a particular movement that cannot be obtained with a simple function. For example, nonlinear interpolation may be performed using a conversion table similar to that of Patent Document 1.

Furthermore, in the embodiment described above, the interpolation component information are created dynamically; however, the interpolation component information may be created and whether or not it is possible to render the interpolation components may be determined based on the interpolation component information in advance prior to the execution of animation display. In this case, an interpolation frame that includes an interpolation component determined to be renderable may be generated and stored in the keyframe information storage unit 12 as an additional new keyframe, and then displayed on the display unit 2 by the display controller 18 in response to a notification from the animation controller 13.

In addition, specific application examples of the animation control apparatus 1 shown in FIG. 1 include a remote controller for a television, a DVD recorder, and the like. Screen components can be displayed by animation on a display screen of a television (the display unit 2) by means of the remote control apparatus (the animation control apparatus 1).

It should be noted that the specific embodiments described above mainly include inventions with the following configurations. In other words, an animation control apparatus according to one aspect of the present invention is an animation control apparatus for displaying on a display unit by animation a screen component configuring a display screen, the apparatus having: a keyframe information storage unit that stores a plurality of keyframe information each of which includes start time information and component information, the start time information expressing a rendering start time at which a rendering process for displaying a screen component on the display unit should be started, the component information expressing a screen component that is displayed on the display unit by starting the rendering process at the rendering start time; an animation controller that acquires a current rendering start time at which the rendering process should be started, and acquires, from the keyframe information storage unit, first keyframe information that includes a first rendering start time prior to the acquired current rendering start time and second keyframe information that includes a second rendering start time following the current rendering start time; an interpolation component information creating unit that interpolates first component information, which is included in the first keyframe information acquired by the animation controller, and second component information, which is included in the second keyframe information acquired by the animation controller, to create interpolation component information expressing an interpolation screen component displayed on the display unit; a rendering performance information storage unit that stores rendering performance information expressing a performance of the rendering process; a rendering time period computing unit that calculates a rendering time period that is required in a rendering process for displaying on the display unit the interpolation screen component expressed by the interpolation component information, on a basis of the rendering performance information stored in the rendering performance information storage unit and the interpolation component information created by the interpolation component information creating unit; a rendering determination unit that determines, on a basis of the rendering time period calculated by the rendering time period computing unit, whether or not a rendering process for displaying the interpolation screen component on the display unit is completed by the second rendering start time included in the second keyframe information; and a display controller that waits until the second rendering start time without performing a rendering process for displaying the interpolation screen component on the display unit, when the rendering determination unit determines that a rendering process for displaying the interpolation screen component on the display unit is not completed by the second rendering start time, and starts a rendering process for displaying, on the display unit, a screen component expressed by the second component information included in the second keyframe information when the second rendering start time is reached.

According to this configuration, waiting is performed until the second rendering start time without performing the rendering process for displaying the interpolation screen component on the display unit, when it is determined that the rendering process for displaying the interpolation screen component on the display unit is not completed by the second rendering start time, and the rendering process for displaying, on the display unit, the screen component expressed by the second component information of the second keyframe information is started, when the second rendering start time is reached. Therefore, there is no occurrence of a situation that the second rendering start time is reached during the rendering process for displaying the interpolation screen component on the display unit. Accordingly, the screen component that is expressed by the second component information included in the second keyframe information can be reliably displayed on the display unit. As a result, an animation trajectory can be prevented from deforming.

In the animation control apparatus described above, when the rendering determination unit determines that the rendering process for displaying the interpolation screen component on the display unit is completed by the second rendering start time, the display controller preferably starts the rendering process for displaying the interpolation screen component on the display unit.

According to this configuration, when it is determined that the rendering process for displaying the interpolation screen component on the display unit is completed by the second rendering start time, the rendering process for displaying the interpolation screen component on the display unit is started. As a result, animation display can be performed to provide the smoothest possible trajectory, while preventing the animation trajectory from deforming.

In the animation control apparatus described above, it is preferable that the rendering determination unit compares an extra time period between the current rendering start time acquired by the animation controller and the second rendering start time included in the second keyframe information, with the rendering time period calculated by the rendering time period computing unit, determines that the rendering process for displaying the interpolation screen component on the display unit is completed when the extra time period is equal to or longer than the rendering time period, and determines that the rendering process for displaying the interpolation screen component on the display unit is not completed when the extra time period is less than the rendering time period.

According to this configuration, whether or not the rendering process for displaying the interpolation screen component on the display unit is completed by the second rendering start time is determined, based on the result of the comparison between the rendering time period and the extra time period between the current rendering start time and the second rendering start time. Therefore, precise determination can be performed.

In the animation control apparatus described above, it is preferable that the animation controller changes a part of the first component information included in the first keyframe information and a part of the second component information included in the second keyframe information, that the interpolation component information creating unit interpolates the first and second component information obtained as a result of the changing by the animation controller, to create the interpolation component information, and that the display controller starts the rendering process for displaying, on the display unit, a screen component expressed by the second component information obtained as a result of the changing, when the second rendering start time is reached.

According to this configuration, the first and second component information that are included, respectively, in the first and second keyframe information are partially changed, and the resultant first and second component information are used. Therefore, the screen components to be displayed on the display unit by animation and the shape of the animation trajectory can be diversified, without increasing the number of keyframe information stored in the keyframe information storage unit.

In the animation control apparatus described above, it is preferable that the component information included in the keyframe information stored in the keyframe information storage unit includes coordinate information on feature points of a screen component, that the rendering performance information storage unit stores, as the rendering performance information, a unit rendering time period required in a process for rendering a unit number of rendering pixels, and that the rendering time period computing unit calculates, based on the coordinate information, a number of update rendering pixels that is required to display, on the display unit, the interpolation screen component expressed by the interpolation component information, and calculates the rendering time period from the number of update rendering pixels and the unit rendering time period stored in the rendering performance information storage unit.

According to this configuration, the rendering time period can be calculated easily from a ratio between the number of update rendering pixels required to display the interpolation screen component on the display unit, and the unit number of rendering pixels, and from the unit rendering time period.

In the animation control apparatus, it is preferable that the component information included in the keyframe information stored in the keyframe information storage unit includes rotation information on rotation of a screen component, that the rendering performance information storage unit stores, as the rendering performance information, a time period required in a rendering process for rotating a screen component, and that the rendering time period computing unit calculates the rendering time period from the rotation information and a time period required in a rendering process for rotating a screen component, which is stored in the rendering performance information storage unit.

According to this configuration, the rendering time period is calculated from the rotation information and the time period required in the rendering process for rotating the screen component. Therefore, the rendering time period can be obtained in consideration of the rotation information on the rotation of the screen component.

In the animation control apparatus described above, it is preferable that the component information included in the keyframe information stored in the keyframe information storage unit includes color information on a screen component, that the rendering performance information storage unit stores, as the rendering performance information, a time period required to perform color composition computation, and that the rendering time period computing unit calculates the rendering time period from the color information and a time period required to perform color composition computation, which is stored in the rendering performance information storage unit.

According to this configuration, the rendering time period is calculated from the color information and the time period required to perform color composition computation. Therefore, the rendering time period can be obtained in consideration of the color information on the screen component.

In the animation control apparatus described above, it is preferable that the component information included in the keyframe information stored in the keyframe information storage unit includes transparency information on a screen component, that the rendering performance information storage unit stores, as the rendering performance information, a time period required to perform color composition computation with respect to transparency, and that the rendering time period computing unit calculates the rendering time period from the transparency information and a time period required to perform color composition computation with respect to transparency, which is stored in the rendering performance information storage unit.

According to this configuration, the rendering time period is calculated from the transparency information and the time period required to perform color composition computation with respect to a transparency. Therefore, the rendering time period can be obtained in consideration of the transparency.

In the animation control apparatus described above, it is preferable that the component information included in the keyframe information stored in the keyframe information storage unit includes size information expressing a size of a screen component, that the rendering performance information storage unit stores, as the rendering performance information, a unit rendering time period required in a process for rendering a unit number of rendering pixels, and that the rendering time period computing unit calculates a number of update rendering pixels that is required to display, on the display unit, the interpolation screen component expressed by the interpolation component information, and calculates the rendering time period from the number of update rendering pixels and the unit rendering time period stored in the rendering performance information storage unit.

According to this configuration, the rendering time period can be calculated easily from a ratio between the number of update rendering pixels required to display the interpolation screen component on the display unit, and the unit number of rendering pixels, and from the unit rendering time period.

In the animation control apparatus described above, it is preferable that the component information included in the keyframe information stored in the keyframe information storage unit includes information indicating that a screen component is a character and information on a font size of the character, that the rendering performance information storage unit stores, as the rendering performance information, a time period required to render a character obtained in accordance with a font size, and that the rendering time period computing unit calculates the rendering time period from the information on a font size of a character and the time period required to render a character, which is stored in the rendering performance information storage unit.

According to this configuration, the rendering time period is calculated from the information on the font size of the character and the time period that is required to render the character obtained in accordance with the font size. Therefore, the rendering time period can be obtained in consideration of the font size of the character.

A display control method according to another aspect of the present invention is an animation control method for displaying on a display unit by animation a screen component configuring a display screen, the method including: a keyframe information preparation step of preparing, in a keyframe information storage unit, a plurality of keyframe information each of which includes start time information and component information, the start time information expressing a rendering start time at which a rendering process for displaying a screen component on the display unit should be started, the component information expressing a screen component that is displayed on the display unit by starting the rendering process at the rendering start time; a rendering start time acquisition step of acquiring a current rendering start time at which the rendering process should be started; a keyframe information acquisition step of acquiring, from the keyframe information storage unit, first keyframe information that includes a first rendering start time prior to the current rendering start time acquired in the rendering start time acquisition step and second keyframe information that includes a second rendering start time which follows the current rendering start time; an interpolation component information creation step of interpolating first component information, which is included in the first keyframe information, and second component information, which is included in the second keyframe information, to create interpolation component information expressing an interpolation screen component displayed on the display unit, the first keyframe information and the second keyframe information having been acquired in the keyframe information acquisition step; a rendering time period computation step of calculating a rendering time period that is required in a rendering process for displaying on the display unit the interpolation screen component expressed by the interpolation component information, on a basis of rendering performance information expressing a performance of the rendering process and the interpolation component information created in the interpolation component information creation step; a rendering determination step of determining, on a basis of the rendering time period calculated in the rendering time period computation step, whether or not a rendering process for displaying the interpolation screen component on the display unit is completed by the second rendering start time included in the second keyframe information; and a display control step of waiting until the second rendering start time without performing a rendering process for displaying the interpolation screen component on the display unit, when determination is made in the rendering determination step that a rendering process for displaying the interpolation screen component on the display unit is not completed by the second rendering start time, and of starting a rendering process for displaying, on the display unit, a screen component expressed by the second component information included in the second keyframe information, when the second rendering start time is reached.

According to this configuration, waiting is performed until the second rendering start time without performing the rendering process for displaying the interpolation screen component on the display unit, when it is determined that the rendering process for displaying the interpolation screen component on the display unit is not completed by the second rendering start time, and the rendering process for displaying, on the display unit, the screen component expressed by the second component information of the second keyframe information is started, when the second rendering start time is reached. Therefore, there is no occurrence of a situation that the second rendering start time is reached during the rendering process for displaying the interpolation screen component on the display unit. Accordingly, the screen component that is expressed by the second component information included in the second keyframe information can be reliably displayed on the display unit. As a result, an animation trajectory can be prevented from deforming.

An animation control program according to yet another aspect of the present invention is an animation control program for displaying on a display unit by animation a screen component configuring a display screen, the program causing a computer to function as: a keyframe information storage unit that stores a plurality of keyframe information each of which includes start time information and component information, the start time information expressing a rendering start time at which a rendering process for displaying a screen component on the display unit should be started, the component information expressing a screen component that is displayed on the display unit by starting the rendering process at the rendering start time; an animation controller that acquires a current rendering start time at which the rendering process should be started, and acquires, from the keyframe information storage unit, first keyframe information that includes a first rendering start time prior to the acquired current rendering start time and second keyframe information that includes a second rendering start time following the current rendering start time; an interpolation component information creating unit that interpolates first component information, which is included in the first keyframe information acquired by the animation controller, and second component information, which is included in the second keyframe information acquired by the animation controller, to create interpolation component information expressing an interpolation screen component displayed on the display unit; a rendering performance information storage unit that stores rendering performance information expressing a performance of the rendering process; a rendering time period computing unit that calculates a rendering time period that is required in a rendering process for displaying on the display unit the interpolation screen component expressed by the interpolation component information, on a basis of the rendering performance information stored in the rendering performance information storage unit and the interpolation component information created by the interpolation component information creating unit; a rendering determination unit that determines, on a basis of the rendering time period calculated by the rendering time period computing unit, whether or not a rendering process for displaying the interpolation screen component on the display unit is completed by the second rendering start time included in the second keyframe information; and a display controller that waits until the second rendering start time without performing a rendering process for displaying the interpolation screen component on the display unit, when the rendering determination unit determines that a rendering process for displaying the interpolation screen component on the display unit is not completed by the second rendering start time, and starts a rendering process for displaying, on the display unit, a screen component expressed by the second component information included in the second keyframe information when the second rendering start time is reached.

According to this configuration, waiting is performed until the second rendering start time without performing the rendering process for displaying the interpolation screen component on the display unit, when it is determined that the rendering process for displaying the interpolation screen component on the display unit is not completed by the second rendering start time, and the rendering process for displaying, on the display unit, the screen component expressed by the second component information of the second keyframe information is started, when the second rendering start time is reached. Therefore, there is no occurrence of a situation that the second rendering start time is reached during the rendering process for displaying the interpolation screen component on the display unit. Accordingly, the screen component that is expressed by the second component information included in the second keyframe information can be reliably displayed on the display unit. As a result, an animation trajectory can be prevented from deforming.

According to the present invention, waiting is performed until the second rendering start time without performing the rendering process for displaying the interpolation screen component on the display unit, when it is determined that the rendering process for displaying the interpolation screen component on the display unit is not completed by the second rendering start time, and the rendering process for displaying, on the display unit, the screen component expressed by the second component information of the second keyframe information is started, when the second rendering start time is reached. Therefore, an animation trajectory can be prevented from deforming.

The present invention exerts the advantageous effect of displaying a screen component by animation without changing the shape of an animation trajectory, and is useful in digital audio-visual equipment, digital appliances, mobile equipment and the like that perform animation display.

The invention claimed is:

1. An animation control apparatus for displaying on a display unit by animation a screen component configuring a display screen, the apparatus comprising:

a keyframe information storage unit that stores a plurality of keyframe information each of which includes start time information and component information, the start time information expressing a rendering start time at which a rendering process for displaying a screen component on the display unit should be started, the component information expressing a screen component that is displayed on the display unit by starting the rendering process at the rendering start time;

an animation controller that acquires a current rendering start time at which the rendering process should be started, and acquires, from the keyframe information storage unit, first keyframe information that includes a first rendering start time prior to the acquired current rendering start time and second keyframe information that includes a second rendering start time following the current rendering start time;

an interpolation component information creating unit that interpolates first component information, which is included in the first keyframe information acquired by the animation controller, and second component information, which is included in the second keyframe information acquired by the animation controller, to create interpolation component information expressing an interpolation screen component displayed on the display unit;

a rendering performance information storage unit that stores rendering performance information expressing a performance of the rendering process;

a rendering time period computing unit that calculates a rendering time period that is required in a rendering process for displaying on the display unit the interpolation screen component expressed by the interpolation component information, on a basis of the rendering performance information stored in the rendering performance information storage unit and the interpolation component information created by the interpolation component information creating unit;

a rendering determination unit that determines, on a basis of the rendering time period calculated by the rendering time period computing unit, whether or not a rendering process for displaying the interpolation screen component on the display unit is completed by the second rendering start time included in the second keyframe information; and a display controller that waits until the second rendering start time without performing a rendering process for displaying the interpolation screen component on the display unit, when the rendering determination unit determines that a rendering process for displaying the interpolation screen component on the display unit is not completed by the second rendering start time, and starts a rendering process for displaying, on the display unit, a screen component expressed by the second component information included in the second keyframe information when the second rendering start time is reached without performing the rendering process for displaying the interpolation screen component.

2. The animation control apparatus according to claim 1, wherein when the rendering determination unit determines that the rendering process for displaying the interpolation screen component on the display unit is completed by the second rendering start time, the display controller starts the rendering process for displaying the interpolation screen component on the display unit.

3. The animation control apparatus according to claim 1, wherein the rendering determination unit compares an extra time period between the current rendering start time acquired by the animation controller and the second rendering start time included in the second keyframe information, with the rendering time period calculated by the rendering time period computing unit, determines that the rendering process for displaying the interpolation screen component on the display unit is completed when the extra time period is equal to or longer than the rendering time period, and determines that the rendering process for displaying the interpolation screen component on the display unit is not completed when the extra time period is less than the rendering time period.

4. The animation control apparatus according to claim 1, wherein
the animation controller changes a part of the first component information included in the first keyframe information and a part of the second component information included in the second keyframe information,
the interpolation component information creating unit interpolates the first and second component information obtained as a result of the changing by the animation controller, to create the interpolation component information, and
the display controller starts the rendering process for displaying, on the display unit, a screen component expressed by the second component information obtained as a result of the changing, when the second rendering start time is reached.

5. The animation control apparatus according to claim 1, wherein
the component information included in the keyframe information stored in the keyframe information storage unit includes coordinate information on feature points of a screen component,
the rendering performance information storage unit stores, as the rendering performance information, a unit rendering time period required in a process for rendering a unit number of rendering pixels, and
the rendering time period computing unit calculates, based on the coordinate information, a number of update rendering pixels that is required to display, on the display unit, the interpolation screen component expressed by the interpolation component information, and calculates the rendering time period from the number of update rendering pixels and the unit rendering time period stored in the rendering performance information storage unit.

6. The animation control apparatus according to claim 1, wherein
the component information included in the keyframe information stored in the keyframe information storage unit includes rotation information on rotation of a screen component,
the rendering performance information storage unit stores, as the rendering performance information, a time period required in a rendering process for rotating a screen component, and
the rendering time period computing unit calculates the rendering time period from the rotation information and a time period required in a rendering process for rotating a screen component, which is stored in the rendering performance information storage unit.

7. The animation control apparatus according to claim 1, wherein
the component information included in the keyframe information stored in the keyframe information storage unit includes color information on a screen component,
the rendering performance information storage unit stores, as the rendering performance information, a time period required to perform color composition computation, and
the rendering time period computing unit calculates the rendering time period from the color information and a time period required to perform color composition computation, which is stored in the rendering performance information storage unit.

8. The animation control apparatus according to claim 1, wherein
the component information included in the keyframe information stored in the keyframe information storage unit includes transparency information on a screen component,
the rendering performance information storage unit stores, as the rendering performance information, a time period required to perform color composition computation with respect to transparency, and
the rendering time period computing unit calculates the rendering time period from the transparency information and a time period required to perform color composition computation with respect to transparency, which is stored in the rendering performance information storage unit.

9. The animation control apparatus according to claim 1, wherein
the component information included in the keyframe information stored in the keyframe information storage unit includes size information expressing a size of a screen component,
the rendering performance information storage unit stores, as the rendering performance information, a unit rendering time period required in a process for rendering a unit number of rendering pixels, and
the rendering time period computing unit calculates a number of update rendering pixels that is required to display, on the display unit, the interpolation screen component expressed by the interpolation component information, and calculates the rendering time period from the number of update rendering pixels and the unit rendering time period stored in the rendering performance information storage unit.

10. The animation control apparatus according to claim 1, wherein
the component information included in the keyframe information stored in the keyframe information storage unit includes information indicating that a screen component is a character and information on a font size of the character,
the rendering performance information storage unit stores, as the rendering performance information, a time period required to render a character obtained in accordance with a font size, and the rendering time period computing unit calculates the rendering time period from the information on a font size of a character and the time period required to render a character, which is stored in the rendering performance information storage unit.

11. An animation control method for displaying on a display unit by animation a screen component configuring a display screen, the method comprising:

a keyframe information preparation step of preparing, in a keyframe information storage unit, a plurality of keyframe information each of which includes start time information and component information, the start time information expressing a rendering start time at which a rendering process for displaying a screen component on the display unit should be started, the component information expressing a screen component that is displayed on the display unit by starting the rendering process at the rendering start time;

a rendering start time acquisition step of acquiring a current rendering start time at which the rendering process should be started;

a keyframe information acquisition step of acquiring, from the keyframe information storage unit, first keyframe information that includes a first rendering start time prior to the current rendering start time acquired in the rendering start time acquisition step and second keyframe information that includes a second rendering start time which follows the current rendering start time;

an interpolation component information creation step of interpolating first component information, which is included in the first keyframe information, and second component information, which is included in the second keyframe information, to create interpolation component information expressing an interpolation screen component displayed on the display unit, the first keyframe information and the second keyframe information having been acquired in the keyframe information acquisition step;

a rendering time period computation step of calculating a rendering time period that is required in a rendering process for displaying on the display unit the interpolation screen component expressed by the interpolation component information, on a basis of rendering performance information expressing a performance of the rendering process and the interpolation component information created in the interpolation component information creation step;

a rendering determination step of determining, on a basis of the rendering time period calculated in the rendering time period computation step, whether or not a rendering process for displaying the interpolation screen component on the display unit is completed by the second rendering start time included in the second keyframe information; and a display control step of waiting until the second rendering start time without performing a rendering process for displaying the interpolation screen component on the display unit, when determination is made in the rendering determination step that a rendering process for displaying the interpolation screen component on the display unit is not completed by the second rendering start time, and of starting a rendering process for displaying, on the display unit, a screen component expressed by the second component information included in the second keyframe information, when the second rendering start time is reached without performing the rendering process for displaying the interpolation screen component.

12. A non-transitory computer readable recording medium storing an animation control program for displaying on a display unit by animation a screen component configuring a display screen, the program causing a computer to function as:

a keyframe information storage unit that stores a plurality of keyframe information each of which includes start time information and component information, the start time information expressing a rendering start time at which a rendering process for displaying a screen component on the display unit should be started, the component information expressing a screen component that is displayed on the display unit by starting the rendering process at the rendering start time;

an animation controller that acquires a current rendering start time at which the rendering process should be started, and acquires, from the keyframe information storage unit, first keyframe information that includes a first rendering start time prior to the acquired current rendering start time and second keyframe information that includes a second rendering start time following the current rendering start time;

an interpolation component information creating unit that interpolates first component information, which is included in the first keyframe information acquired by the animation controller, and second component information, which is included in the second keyframe information acquired by the animation controller, to create interpolation component information expressing an interpolation screen component displayed on the display unit;

a rendering performance information storage unit that stores rendering performance information expressing a performance of the rendering process;

a rendering time period computing unit that calculates a rendering time period that is required in a rendering process for displaying on the display unit the interpolation screen component expressed by the interpolation component information, on a basis of the rendering performance information stored in the rendering performance information storage unit and the interpolation component information created by the interpolation component information creating unit;

a rendering determination unit that determines, on a basis of the rendering time period calculated by the rendering time period computing unit, whether or not a rendering process for displaying the interpolation screen component on the display unit is completed by the second rendering start time included in the second keyframe information; and a display controller that waits until the second rendering start time without performing a rendering process for displaying the interpolation screen component on the display unit, when the rendering determination unit determines that a rendering process for displaying the interpolation screen component on the display unit is not completed by the second rendering start time, and starts a rendering process for displaying, on the display unit, a screen component expressed by the second component information included in the second keyframe information when the second rendering start time is reached without performing the rendering process for displaying the interpolation screen component.

* * * * *